US006781702B2

(12) United States Patent
Giannakopoulos et al.

(10) Patent No.: US 6,781,702 B2
(45) Date of Patent: Aug. 24, 2004

(54) DETERMINING LARGE DEFORMATIONS AND STRESSES OF LAYERED AND GRADED STRUCTURES TO INCLUDE EFFECTS OF BODY FORCES

(75) Inventors: Antonios Giannakopoulos, Athens (GR); Subra Suresh, Wellesley, MA (US); Ares J. Rosakis, Altadena, CA (US); Ilan Blech, Los Altos, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/157,735

(22) Filed: May 28, 2002

(65) Prior Publication Data

US 2003/0106378 A1 Jun. 12, 2003

Related U.S. Application Data

(60) Provisional application No. 60/293,562, filed on May 25, 2001.

(51) Int. Cl.[7] .............................................. G01B 11/30
(52) U.S. Cl. ...................................... 356/601; 356/521
(58) Field of Search ................................ 356/600, 601, 356/511, 521, 488–489, 388; 73/785, 800, 804; 250/226, 560

(56) References Cited

U.S. PATENT DOCUMENTS

| 5,134,303 | A | * | 7/1992 | Blech et al. | ........... | 250/559.23 |
|---|---|---|---|---|---|---|
| 5,232,547 | A | * | 8/1993 | Drowley et al. | ............... | 117/55 |
| 5,572,323 | A | * | 11/1996 | Maeda et al. | ................ | 356/499 |
| 6,025,918 | A | * | 2/2000 | Maris | .......................... | 356/388 |
| 6,031,611 | A | * | 2/2000 | Rosakis et al. | ............. | 356/511 |
| 6,513,389 | B2 | * | 2/2003 | Suresh et al. | ................. | 73/785 |
| 6,600,565 | B1 | * | 7/2003 | Suresh et al. | ............... | 356/521 |

OTHER PUBLICATIONS

Giannakopoulos, A.E. et al. "Large deformation of thin films and layered flat panels: effects of gravity," Acta Mater. 49: 3671–3688 (2001).

Finot, M. et al. "Large transformation and geometric instability of substrates with thin–film deposits." J. Appl. Phys. 81(8): 3457 (1997).

* cited by examiner

Primary Examiner—Frank G. Font
Assistant Examiner—Sang H. Nguyen
(74) Attorney, Agent, or Firm—Fish & Richardson P.C.

(57) ABSTRACT

Techniques for determining large deformation of layered or graded structures to include effects of body forces such as gravity, electrostatic or electromagnetic forces, and other forces that uniformly distribute over the structures, support forces, and concentrated forces. A real-time stress monitoring system is also disclosed to provide in-situ monitoring of a device based on the large deformation analytical approach. A coherent gradient sensing module, for example, may be included in such a system.

21 Claims, 13 Drawing Sheets

DETERMINING LARGE DEFORMATIONS AND STRESSES OF LAYERED AND GRADED STRUCTURES TO INCLUDE EFFECTS OF BODY FORCES

This application claims the benefit of U.S. Provisional Application No. 60/293,562 filed on May 25, 2001, the entire disclosure of which is incorporated herein by reference as part of this application.

BACKGROUND

This application relates to measurement and analysis of stresses in devices with features fabricated on substrates.

Substrates formed of suitable solid-state materials may be used as platforms to support various structures, such as large panels with layers or coatings formed thereon and microstructures integrated to the substrates. Examples of large panels include, among others, aeronautical and marine components and structures. Examples of substrate-based integrated devices with one or more layers or films include, among others, integrated electronic circuits, integrated optical devices, micro-electro-mechanical systems, flat panel display systems, or a combination of two or more of the above devices.

In the above and other structures, components, and devices, different materials or different structures are usually formed on the same substrate and are in contact with one another. Some devices may also use complex multilayer or continuously graded geometries. Hence, the interfacing of different materials and different structures may cause a complex stress state in each feature due to differences in the material properties and the structure at interconnections under different fabrication condition and environmental factors (e.g., variations or fluctuations in temperature). In fabrication of an integrated circuit, for example, the stress state of the interconnect conducting lines may be affected by film deposition, rapid thermal cycling, chemical-mechanical polishing, and passivation during the fabrication process. Stresses caused by these and other factors may adversely the performance and reliability of the devices and may even cause device failure.

Hence, measurements and analysis of changes in stresses and deformation of a substrate and features fabricated on the substrate may have important applications in various industrial areas. For example, it is desirable to measure stresses on various features formed on the substrate to improve the design of the device structure, selection of materials, fabrication process, and other aspects of the devices so that the yield, device performance, and device reliability of the device can be enhanced. The stress measurements may be used to assess or evaluate the reliability of materials against failure from such phenomena as stress migration and electromigration, stress-voiding and hillock formation. The stress measurements may also be used to facilitate quality control of the mechanical integrity and electromechanical functioning of circuit chip dies during large scale production in wafer fabrication facilities. In addition, the stress measurements may be used to improve the design of various fabrication processes and techniques, such as thermal treatments (e.g., temperature excursions during passivation and annealing) and chemical and mechanical treatments (e.g., polishing) to reduce residual stresses in the final device.

SUMMARY

This application includes techniques for determining large deformation of layered or graded structures to include effects of body forces, such as gravity, electrostatic or electromagnetic forces, loading or supporting forces, and other forces that uniformly distributed over the structures, and effects of forces that concentrate at certain locations of the structures.

In one embodiment, the technique includes the following steps. A plate structure formed of one or more materials is used to represent a device which may have one or more discrete layers, a continuously graded structure, or a combination of both. Each material is assumed to exhibit linear elastic deformation. A first spatial-varying function, that is uniform within a plane of the plate structure and varies along a direction perpendicular to the plane, is used to represent a body force acting on the device which affects evolution of curvature of the device. A second spatial-varying function, that is uniform within the plane and varies along a direction perpendicular to the plane and with a temperature of the device, is also used to represent effects of thermal stresses in the device. Nonlinear functions of positions within the plane are further used to represent displacements of the device within two principal directions within the plane and a third principal direction perpendicular to the plane, respectively, to include effects of large deformation.

Next, a total potential energy of the device is computed based on the first and the second spatial-varying functions and the nonlinear functions for the displacements. The total potential energy are then minimized with respect to principal curvatures and axial stretches respectively along the two principal directions within the plane to derive analytical relationships between an effective force for causing curvature evolution of the device and principal curvatures along the two principal directions.

The above analytical method may be combined with a technique for measuring curvatures of surfaces to determine stresses in devices with a plate structure including multilayered devices. For example, an optical coherent gradient sensing (CGS) method may be used to provide full-field, real-time, and noninvasive measurements of curvatures of reflective surfaces to analysis under the large deformation analytical method. A stress monitoring system may be constructed based on the combination to provide in-situ monitoring during fabrication of devices such as flat panels and semiconductor circuits.

DETAILED DESCRIPTION

Figure 1:
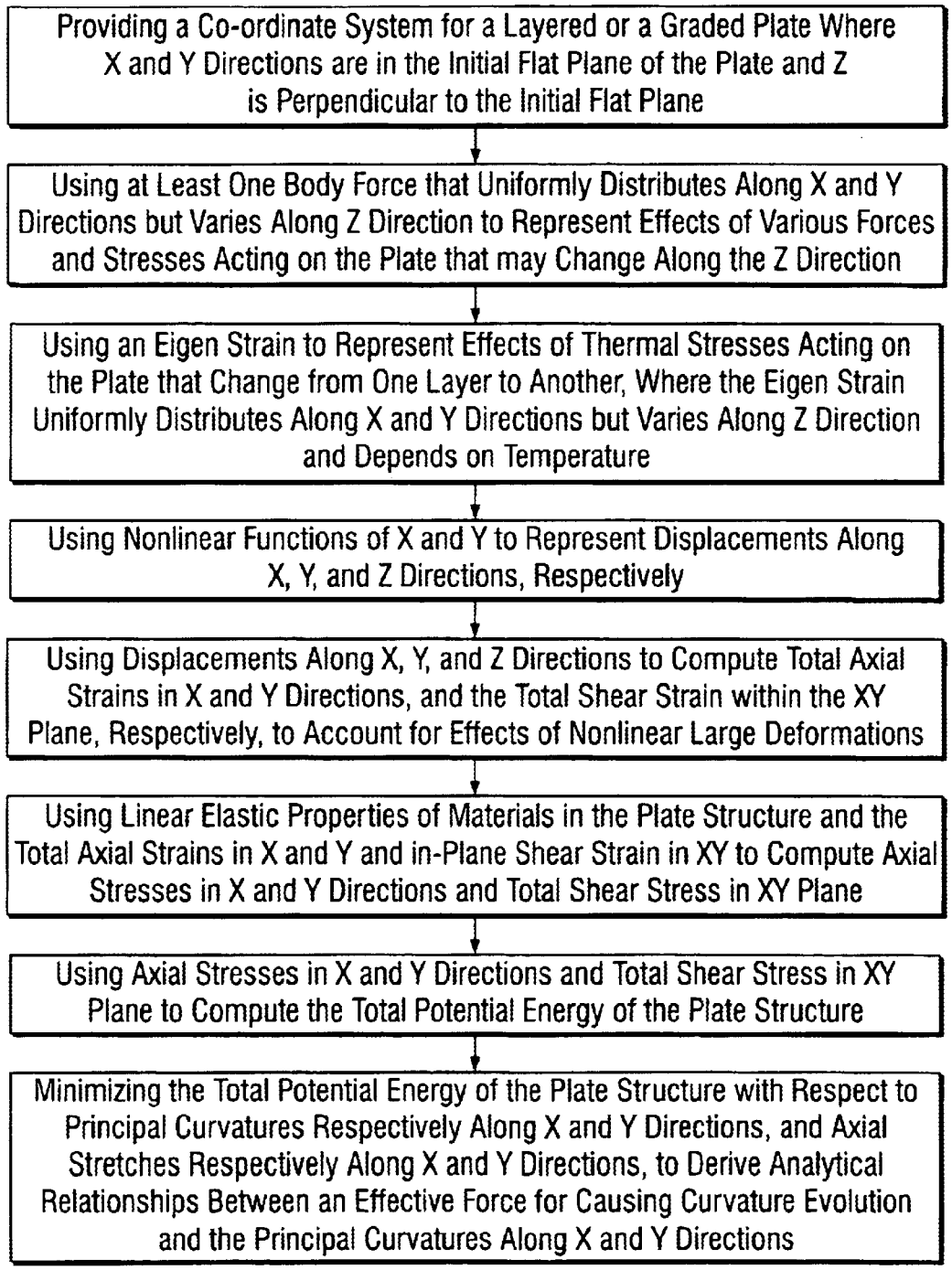
FIG. 1 shows one embodiment of a large deformation analytical method for analyzing a plate structure.

Stresses in a uniform plate or a multilayer structure and the associated curvatures are related. This relationship may be used to study the stresses and the curvature evolution or surface deformation caused by the stresses. When the stress-caused out-of-plane deflection of a structure is small compared to the total thickness of the structure, various approximation techniques may be used to derive the relationship between the curvature and the stress. One example is the Stony formula:

$$\sigma_f = \frac{E_{bi}h^2}{6h_f}K_{Stoney}, \quad (1)$$

where $\sigma_f$ is the uniform equi-biaxial stress in a thin film of a thickness of $h_f$ on a substrate of a thickness of h and with a curvature $K_{Stoney}$, and $E_{bi}$ is the biaxial elastic modulus of the substrate. See, Stoney, G. G., Proc. Royal Soc. London, 1909, A82, 172.

When the out-of-plane deflection in a layered or graded material becomes comparable to the total layer thickness, the small deformation approaches such as the above Stoney formula become inaccurate and thus large deformation plate analyses become necessary to account for various effects associated with large deformations. In these cases, the results of many small deformation analyses may significantly deviate from the actual stress, geometric shape and curvature under large deformations. Various large deformation analyses have been developed for more accurate stress analysis and estimates in various applications, even under conditions where small strains prevail. Examples of applications of large deformation analyses include but are not limited to, device fabrication and design. Mores specifically, the fabrication of computer chips from Si wafer substrates of with a diameter of 300 mm (12 inch) or greater and flat panel displays with thin film deposits has generated interest in the study of large deformations and geometric instabilities of the substrate-film system.

Large deformations may be analyzed by using the finite element approach based on numerical computation. Finite element analysis and actual measurements in layered or graded plates suggest that, the substrate curvature and shape may not be uniform and may exhibit a radial or in-plane variation from the edges to the interior. In general, the finite element approach is complex and computationally demanding, and thus may be not practical in some applications where a real-time measurement is needed to provide dynamic, in-situ response.

This application provides a general large deformation analytical method to quantify large deformation in various structures, including multi-layered and graded materials, without the complexity and computational burden of the finite element approach. In particular, this large deformation analytical method is designed to account for effects of any body forces in the layered or graded structures, including effects of gravitational and electromagnetic fields. In various circumstances, such forces could have a significant influence on the curvature shape as well as the conditions governing the onset of geometric instability in thin-film, multi-layered and graded systems. The this large deformation analytical method also accounts for the effects caused by the manner in which such systems are mechanically supported during the measurement of curvature and the relative orientation of the out-of-plane normal to the direction of the body force would be expected to have a substantial effect on the measured curvature. The large deformation analytical method allows for investigation of the interactions between the body force and the mismatch strain in a layered or graded system as they collectively influence the large deformation response.

Indeed, the effects of body forces, such as gravity, on substrate curvature evolution and geometric stability, are of considerable interest in the manufacturing and service of layered or graded structures in a variety of technological applications. Examples where the weight of the substrate is expected to influence large deformation include but are not limited to: the deposition and planarization of thin films on large Si substrates, e.g., with current in-plane dimensions of 300 mm, which is expected to increase to as high as 500 mm within the next decade, and the manufacture of flat panel displays made of glass panels with thin films deposits, e.g., as large as 600 mm×600 mm×1.1 mm.

As described below, this large deformation analytical method provides analytical formulae to directly associate the effects of the body forces and the thermal stresses to curvatures in two principal directions such as orthogonal in-plane x and y directions. Hence, in cases where the curvatures can be measured, the present large deformation analytical method may be used to directly compute the effective stress caused by various body forces and the spatially-varying thermal stresses based on the measured curvatures. The analytical formulae ensure that the computations are straight forward and can be carried out at a high speed when proper digital processors such as computers are used. In particular, when the curvatures may be measured at a high speed, this large deformation analytical method may be used to provide a real-time measurement of the stresses of a layered or graded structure. Hence, during fabrication, such real-time curvature measurement and the large deformation analytical method may be combined to provide a dynamic and in-situ measurement to allow for a real-time control of the fabrication conditions through appropriate feedback and control mechanisms.

FIG. 1 shows one embodiment of the large deformation analytical method for analyzing a layered or continuously graded plate structure with a uniform thickness. The plate structure may include a substrate that is formed of a solid material, such as organic and inorganic solid materials. The substrate may be uniform or graded along the direction perpendicular to the substrate surface. Examples of substrate materials include, but are not limited to, dielectrics (e.g., oxides and nitrides), glass materials, metallic materials, semiconductors, and polymers. One or more layers or films may be formed over the substrate. Each layer or film may be uniform or graded along the direction perpendicular to the substrate surface. The material for each layer or film may be organic and inorganic. Examples of suitable materials of such a layer or film in the plate structure include, but are not limited to, dielectrics (e.g., oxides and nitrides), glass materials, metallic materials, semiconductors, polymers, biological material films, and viscous fluid films.

Notably, the present large deformation analytical method recognizes uniform body forces, such as gravitational, electrostatic, and electromagnetic forces, may have significant effects on the evolution of curvature, shape and instability when the out-of-plane deflection is large. Therefore, effects of such uniform body forces and concentrated load forces are included in the method. It is assumed that the plate structure exhibits isotropic, linear elastic deformation with small strains and moderate rotations. The thermal and mechanical properties of the layered or graded material are allowed to vary along the direction perpendicular to the plate structure so as to derive a general result for multilayers and graded materials. Explicit analytical expressions are derived for the critical curvature and the critical "effective load" at which curvature bifurcation occurs.

In this embodiment, a coordinate system is established for the plate structure to have two different coordinate directions in the plane of the plate structure and a third coordinate direction perpendicular to the plane. For example, the two in-plane directions may be orthogonal to each other as x and y axes and the third direction is the z axis in a xyz Cartesian coordinate system. Next, the effects of thermal stresses and body forces in the plate structure are represented by spatially-varying functions. For example, a body force that uniformly distributes along x and y directions but varies along z direction to represent effects of various body forces acting on the plate that change from one layer to another, including the gravity and electromagnetic forces. In addition, a load on the center of gravity of the plate structure in a direction perpendicular to the xy plane may also be included in the body force. With respect to thermal stresses, an eigen strain is used to represent effects of thermal stresses acting on the plate structure that may change from one layer to another. The eigen strain is presumed to uniformly distribute along x and y directions but vary along z direction. It is further assumed that the eigen strain is a function of temperature.

This embodiment of the large deformation analytical method also uses nonlinear functions of x and y to represent displacements along x, y, and z directions, respectively. In particular, the out-of-plane displacement along the z direction is presumed to depend on both principal curvatures along x and y directions. Such displacements along x, y, and z directions are then used to compute total axial strains in x and y directions, and the total shear strain within the xy plane, respectively, to account for effects of nonlinear large deformations.

Assuming each material in the plate structure is isotropic and is linearly elastic, this embodiment next proceeds to compute axial stresses in x and y directions and total shear stress in xy plane based on the linear elastic properties of different layers in the layered or graded plate structure, such as the Young's modulus and the Poisson ratio, and the total axial strains in x and y and the in-plane shear strain in xy. The above axial stresses in x and y directions and total shear stress in xy plane are then used to compute the total potential energy of the layered or graded plate structure.

Finally, the total potential energy of the layered or graded plate structure is minimized with respect to principal curvatures respectively along x and y directions, and axial stretches respectively along x and y directions, to derive analytical relationships between an effective force for causing curvature evolution of the layered or graded plate structure and the principal curvatures along x and y directions. The analytical relationships are then used to analyze the stress state of the plate structure under large deformation without the numerical computation of the finite element methods. As described below in detail, one consequence of large deformation is the instability of the curvature evolution after the curvatures reach a critical value. In particular, the geometric shape bifurcates at the critical curvature value as confirmed by the finite element numerical computations. Notably, when the deformation is small relative to the total thickness of the plate where various small approximation methods are workable, the results of the present large deformation analytical method essentially conform to those of the small approximation methods. Hence, the present large deformation analytical method may be used in both small and large deformation conditions.

Figure 2:
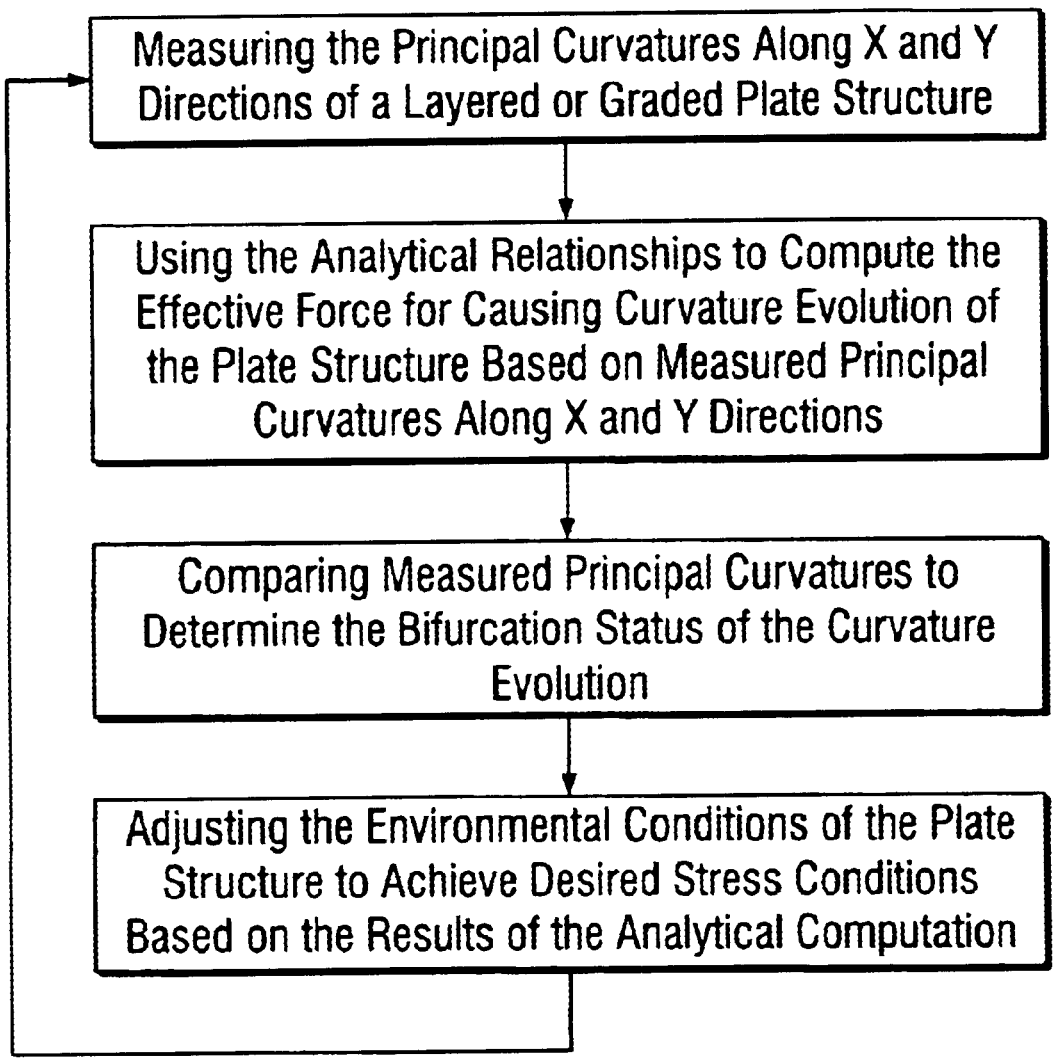
FIG. 2 shows one application of the analytical method shown in FIG. 1.

FIG. 2 shows one exemplary application of the above large deformation analytical method. For a given layered or graded plate structure, a suitable method may be used to measure the principal curvatures, e.g., along two orthogonal x and y directions. Next, the analytical relationships under the large deformation analytical method may be used to compute the effective force for causing curvature evolution of the layered or graded plate structure based on the measured principal curvatures and to determine the bifurcation of the curvature evolution based on the measured curvatures. When the measuring technique used is sufficiently fast, this system may be used to provide a real time monitoring and control of the stress condition of the plate. As shown in the last step in FIG. 2, the environmental conditions of the plate may be adjusted based on the real-time measurement and assessment of the stress condition under the large deformation analytical method to set the plate in a desired stress condition. The above process may be continuously repeated to dynamically control the stress condition of the plate structure in real time. For example, the above technique may be used in a fabrication process of the plate structure to monitor and adjust the fabrication condition to reduce the stresses in the plate structure below some threshold values to ensure the reliability of the final product.

The following sections describe details of the embodiment of the large deformation analytical method shown in FIG. 1 and its applications to specific plate structures in square, rectangular, and circular plate geometries as examples. In addition, a system is described for real-time, in-situ monitoring of thermal stresses which may be used to implement the method in FIG. 2. More specifically, a coherent gradient sensing technique may be used to provide full-field, real-time, in-situ, noninvasive measurement the surface curvatures. In addition, the large deformation analytical method may be used to design a proper support configuration for a plate structure such as a flat panel to substantially reduce or minimize the stresses in the structure in its operating environment.

Figure 3:
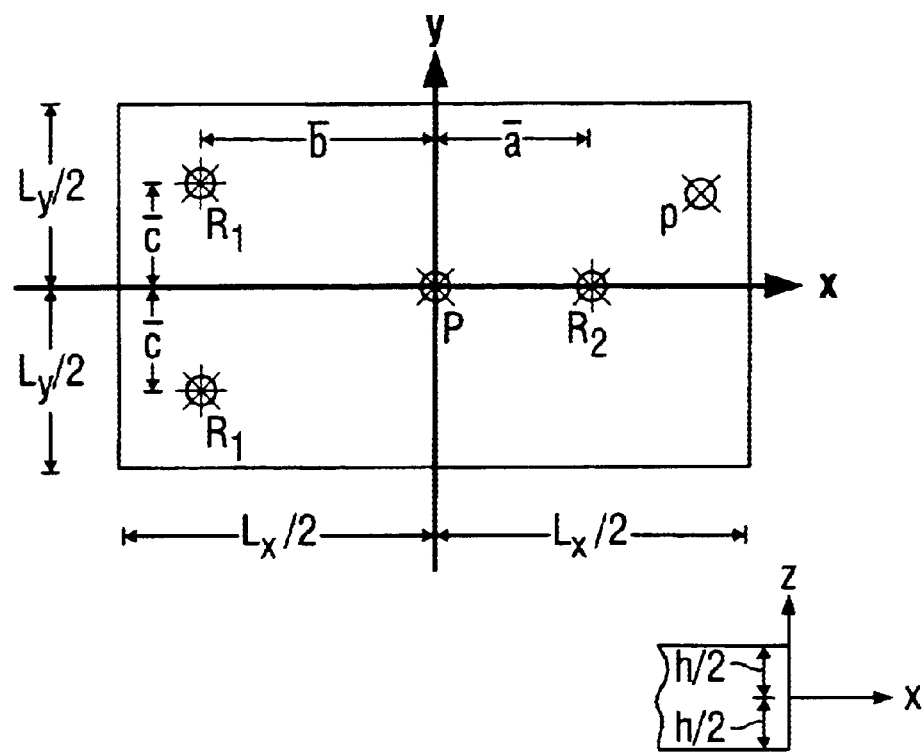
FIG. 3 shows a plate structure in a selected coordinate system where the plate structure is supported horizontally at three support points as one example to illustrate operations of the analytical method in FIG. 1.

FIG. 3 shows a plate structure and an associated Cartesian coordinate system for illustrating the application of the large deformation analytical method outlined in FIG. 1. The following explicit analytical expressions are derived for a three-point support with arbitrary spacing between the supports: (a) the curvature at the center of symmetry of the layered or graded plate before, at and after bifurcation, (b) the critical mismatch stress at which bifurcation results, (c) the curvatures in the vicinity of free edges, (d) the effects of the distances between the mechanical supports of the layered or graded plate structure on edge and center curvatures, and (e) the effect of stacking sequence of the different layers in the multi-layer on edge and center curvatures. The effects of superimposed normal loads at the center on large deformation are also analyzed. These analytical predictions are then compared with full three-dimensional finite element analyses including small and large strains and rotations, and with two-dimensional simulations involving plate elements. The analytical and computational results are then checked with detailed experimental observations of curvature and shape evolution in a flat panel plate of glass with a thin film of silicon nitride deposited thereon, and with prior experimental results of large deformation in Si substrates with metal films where the effects of gravity could be neglected.

Horizontal Arrangement of the Layered or Graded Panels

Consider an initially flat, layered or graded plate whose in-plane reference coordinates are denoted by x and y, FIG. 3. The plate is assumed to be of rectangular shape with in-plane dimensions $L_x \times L_y$, and a uniform thickness, h, along the z-axis. The plate is isostatically supported at distances $\bar{a}$, $\bar{b}$ and $\bar{c}$ from its center, as shown in FIG. 3. These normal supports, which constrain only the vertical displacement, are assumed frictionless.

The plate undergoes initial deformation due to a uniformly distributed force, p (i.e. a force that is uniform with respect to the in-plane coordinates (x, y)). Such a force may be gravity, electrostatic force, magnetic static force, or electromagnetic force. Other forces, such as support forces, may also be included. In the case of gravity, the force may be expressed as $$p = g \cdot <\rho(z)>, \quad (2)$$

where p(z) is the material mass density, g is the acceleration due to gravity (whose positive direction is opposite to the z direction) and < > denotes integration in the z direction.†

Figure 4:
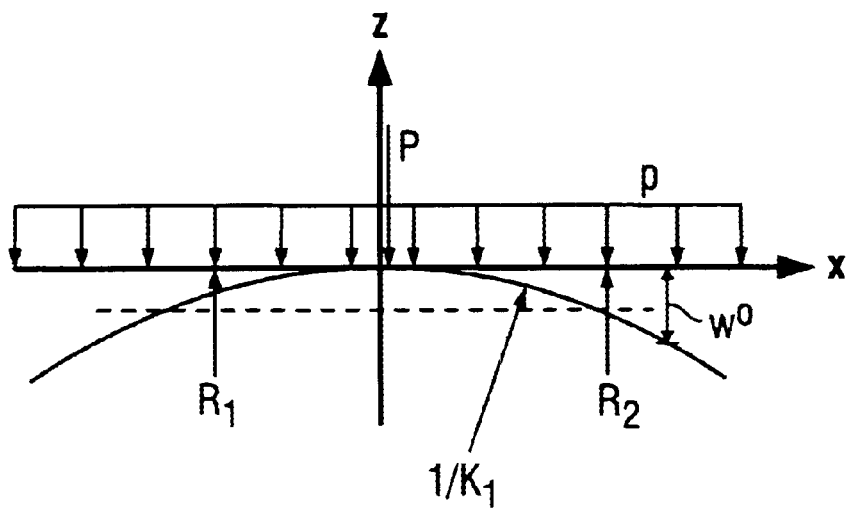
FIG. 4 shows a side view of the plate structure and the associated coordinate system, where the curved line represents the curved plate structure.

In addition to gravity, thermal stresses which may vary along the plate thickness direction, produce stress-free strains (eigenstrains):

$$e(z,T) = \alpha(z,T) \Delta T(z), \quad (3)$$

where α is the thermal expansion coefficient which is an explicit function of position z along the thickness and of temperature T, and ΔT is the temperature change that produces eigenstrains. In the most general case analyzed here, e(z,T) could also include any other type of monotonically increasing eigenstrain (arising, for example, from shrinkage, moisture absorption, or phase transformation). Finally, a normally applied load, P, concentrated at the plate's center of gravity can additionally be included in the present analysis and can be used to modify the present results as indicated in a later section. The quantities p and P are positive when directed as shown in FIG. 4. Under this assumption, different layers have different thermal stresses. For example, in a substrate with one or more films deposited thereon, Equation (3) may include a contribution due to thermal stress in one film and another different contribution due thermal stress in substrate.

A Cartesian coordinate system shown in FIG. 4 follows the vertical displacement of the plate's center. The out-of-plane displacement at the center of the plate is approximated as $$w^o = \frac{1}{2}(K_1 x^2 + K_2 y^2), \quad (4)$$

where $K_1$ and $K_2$ are the principal curvatures along the x and y directions and are assumed to be radially invariant; $w^o$, $K_1$ and $K_2$ are positive as indicated in FIG. 4. In the most general case of a rectangular plate, equation (4) may not be a good approximation because the deformed configuration may not represent a developable surface that is capable of capturing either the cylindrical or the conical surface which evolves after bifurcation (unless either K1=0 or K2=0). This is further discussed at a later section of this application. Following Harper and Wu in Int. J. Solids and Struct., Volume 26, page 511 (1990), the in-plane displacements along the x and y directions, respectively, are approximated as $$u^o = c_1 x - \frac{1}{6} K_1^2 x^3 - \frac{1}{4} K_1 K_2 x y^2, \quad (5)$$

$$v^o = c_2 y - \frac{1}{6} K_2^2 y^3 - \frac{1}{4} K_1 K_2 y x^2,$$

where $c_1$ and $c_2$ are the axial stretches along the x and y directions, respectively, of the plate. In the above approximation, the deformation depends on four variables, $K_1$, $K_2$, $c_1$ and $c_2$, which are nonlinear functions of gravitational loads, eigenstrains, and any concentrated mechanical forces.

The membrane strains at the mid-plane (z=0) are related to the displacements by known nonlinear relations. Assuming small to moderate rotations, the total strains can be approximated from equations (4) and (5) as:

$$\varepsilon_x = \frac{\partial u^o}{\partial x} + \frac{1}{2}\left(\frac{\partial w^o}{\partial x}\right)^2 - z\frac{\partial^2 w^o}{\partial x^2} = c_1 - \frac{K_1 K_2}{4} y^2 - K_1 z, \quad (6a)$$

$$\varepsilon_y = \frac{\partial u^o}{\partial y} + \frac{1}{2}\left(\frac{\partial w^o}{\partial y}\right)^2 - z\frac{\partial^2 y^o}{\partial x^2} = c_2 - \frac{K_1 K_2}{4} x^2 - K_2 z, \quad (6b)$$

$$\gamma_{xy} = \frac{\partial u^o}{\partial y} + \frac{\partial v^o}{\partial x} + \frac{\partial w^o}{\partial x}\frac{\partial w^o}{\partial y} - 2z\frac{\partial^2 w^o}{\partial x \partial y} = 0. \quad (6c)$$

The material is taken to be isotropic and linear elastic with Young's modulus, E, and Poisson-ratio, v. With twisting neglected, the stresses are written as $$\sigma_x = \frac{E}{1-v^2}(\varepsilon_x + v\varepsilon_y) - \frac{E}{1-v}e, \quad (7)$$

$$\sigma_y = \frac{E}{1-v^2}(\varepsilon_y + v\varepsilon_x) - \frac{E}{1-v}e,$$

$$\sigma_{xy} = \frac{E}{2(1+v)}\gamma_{xy}.$$

All material properties (i.e. E, v, and α) can be explicit functions of z and T. Note that the strains are assumed to be continuous across the interfaces along the thickness (i.e. absence of delamination or relative slip between layers). The last terms in the expressions for $\sigma_x$ and $\sigma_y$ in equation (7) represent equi-biaxial thermal stresses in the layered or graded plate. Note that the biaxial modulus is denoted as $E_{bi}=E/(1-v)$, and the plane strain modulus is defined as $E_{pe}=E/(1-v^2)$.

Energy Minimization Formulation

The reaction forces at the simple supports of a uniform plate (see FIGS. 3 and 4) can be found from static equilibrium:

$$R_1 = \frac{pL_xL_y}{2[1+(\bar{a}/\bar{b})]}, \quad R_2 = \frac{pL_xL_y(\bar{a}/\bar{b})}{1+(\bar{a}/\bar{b})}. \tag{8}$$

The total potential energy, V, is $$V = \tag{9}$$
$$\int_{-L_y/2}^{L_y/2}\int_{-L_x/2}^{L_x/2}\int_{-h/2}^{h/2}\frac{1}{2E}(\sigma_x^2+\sigma_y^2-2v\sigma_x\sigma_y+2(1+v)\sigma_{xy})dzdxdy +$$
$$\frac{pL_xL_y}{24}(K_1L_x^2+K_2L_y^2) - \frac{pL_xL_y}{2(1+\bar{a}/\bar{b})}[K_1\bar{a}(\bar{a}+\bar{b})+K_2\bar{a}^2].$$

Note that the thermal strains are included through the constitutive relations given in equation (7). Equilibrium is satisfied from the stationarity of total potential energy which gives $$\frac{\partial V}{\partial c_1}=0, \frac{\partial V}{\partial c_2}=0, \frac{\partial V}{\partial K_1}=0, \frac{\partial V}{\partial K_2}=0. \tag{10}$$

Analytical Results for Square Panels

First consider the case of square panels for which $L_x=L_y=L$. Solving the equilibrium equation (10) for square plates gives $$c_1 = \frac{\langle E_{bi}\cdot e\rangle}{\langle E_{bi}\rangle} + \frac{K_1K_2}{48}L^2 + K_1A_1 + K_2A_2, \tag{11a}$$

$$c_2 = \frac{\langle E_{bi}\cdot e\rangle}{\langle E_{bi}\rangle} + \frac{K_1K_2}{48}L^2 + K_1A_2 + K_2A_1, \tag{11b}$$

where, as noted earlier, the brackets <> denote the integral of the included quantity along the plate's thickness. The constants, $A_1$ and $A_2$, contain only elastic material properties and are given by $$A_1 = \frac{\langle E_{pe}\cdot(vz)\rangle\cdot\langle E_{pe}\rangle - \langle E_{pe}\cdot z\rangle\langle E_{pe}\cdot v\rangle}{\langle E_{pe}\cdot(1-v)\rangle\cdot\langle E_{bi}\rangle}. \tag{12}$$

$$A_2 = \frac{\langle E_{pe}\cdot z\rangle\cdot\langle E_{pe}\rangle - \langle E_{pe}\cdot(vz)\rangle\langle E_{pe}\cdot v\rangle}{\langle E_{pe}\cdot(1-v)\rangle\cdot\langle E_{bi}\rangle}, \tag{13}$$

From equations (12) and (13), it can be seen that $A_2>A_1$.

From equilibrium equation (10), the curvatures $K_1$ and $K_2$ must satisfy the following equations:

$$2K_1K_2^2L^4A_3+K_1A_4+K_2A_5+f_e=0, \tag{14a}$$

$$2K_1^2K_2L^4A_3+K_2A_4+K_1A_5+f_e=0, \tag{14b}$$

where the constants $A_3$, $A_4$ and $A5$ contain only elastic properties, $f_e$ represents an effective "driving force" for curvature evolution which comprises mismatch strains, concentrated mechanical loads and gravity. These parameters are defined as follows:

$$A_3 = \frac{1}{1440}\langle E_{pE}\rangle, \tag{15}$$

$$A_4=2\{\langle E_{pE}\cdot z^2\rangle - A_1\langle E_{pE}\cdot z\rangle - A_2\langle E_{pE}\cdot(vz)\rangle\}, \tag{16}$$

$$A_5=2\{\langle E_{pE}\cdot(vz^2)\rangle - A_2\langle E_{pE}\cdot z\rangle - A_1\langle E_{pE}\cdot(vz)\rangle\}, \tag{17}$$

$$f_e = 2\langle E_{bi}\cdot(ez)\rangle - 2\langle E_{bi}\cdot e\rangle\cdot\frac{\langle E_{bi}\cdot z\rangle}{\langle E_{bi}\rangle} - \frac{p}{12}L^2 + \tag{18}$$
$$p\frac{a(\bar{a}+\bar{b})+c^2}{1+\bar{a}/\bar{b}}.$$

It is implicitly assumed that all components of $f_e$ are applied simultaneously.

Equation (14) have two possible real solutions. The first corresponds to $K_1=K_2$ and the second to $K_1 \neq K_2$. The stability of the system can be investigated by examining the sign of $$D=2A_3L^4-4A_4^2(A_4-A_5)/f_e. \tag{19}$$

If D>0, then $K_1 \neq K_2$, and $K_1+K_2=-f_e/A_2$. There are two formal solutions representing the two possible modes of out-of-plane deformation:

$$\frac{K_1}{f_e} = -\frac{1}{2A_4} \pm \frac{1}{2}\sqrt{\frac{D}{2A_3A_4^2L^4}}, \tag{20}$$

$$\frac{K_2}{f_e} = -\frac{1}{2A_4} \mp \frac{1}{2}\sqrt{\frac{D}{2A_3A_4^2L^4}}.$$

Initial imperfections in the load or the geometry (e.g. small variations in length or thickness) force the out-of-plane deformation to follow one of these possible modes, with one curvature increasing in the longer plate direction and the other decreasing in the shorter plate direction.

If D<0 (i.e. when $A_4-A_5>0$), $$K_1 = K_2 = \left(-\frac{A_7}{2}\sqrt{\frac{A_7^2}{4}+\frac{A_6^3}{27}}\right)^{1/3} - \left(\frac{A_7}{2}+\sqrt{\frac{A_7^2}{4}+\frac{A_6^3}{27}}\right)^{1/3}, \tag{21}$$

where $$A_6 = \frac{(A_4+A_5)}{A_3L^4}, A_7 = \frac{f_c}{A_3L^4}, \tag{22}$$

and $(A_7^2/4+A_6^3/27>0)$. These two equations provide the analytical expressions for the non-linear spherical curvature of the flat panel prior to the onset of bifurcation.

In the limiting case of the very initial linear response, the following small deformation results are captured:

$$K_1 = K_2 = K \approx -\frac{f_c}{A_4+A_5}; |K_1K_2| \ll \frac{1}{L^2}, \tag{23}$$

$$c_1 = c_2 = c \approx \frac{\langle E_{bi}\cdot e\rangle}{\langle E_{bi}\rangle} + K_1(A_1+A_2). \tag{24}$$

If in addition, p, P→0, equations (23) and (24) are identical to the small deformation results of Freund in J.

Crystal Growth, Volume 132, page 341(1993), Giannako-poulos et al. in Acta Metall. Material, volume 43, page 1335 (1995) and Suresh et al. in J. Mech. Phys. Solids, volume 42, page 979 (1994) for layered and graded plates.

As the loads increase, the plate deformation changes from initially linear variation of curvature with respect to all loading factors to a strongly nonlinear variation, while still preserving the spherical shape of the plate. For these situations, D<0 and $K_1=K_2$, as described by equation (21). As the loading increases further, there exists a critical "driving force" above which D>0. At this transition point, the plate shape becomes non-spherical, and K1≠K2, as described by equations (19) and (20). At the transition point, D=0, the solution bifurcates. The critical effective load level at the point of bifurcation is given by $$|f_e|_{cl} = 2|A_4|\sqrt{\frac{|A_4-A_5|}{2A_3L^4}}. \tag{25}$$

The critical combination of gravity, mismatch strain and concentrated mechanical load that triggers bifurcation is reflected in $f_e$ as shown in equation (18). The corresponding critical curvature is written as $$|K_{cr}| = \sqrt{\frac{|A_4-A_5|}{2A_3L^4}}. \tag{26}$$

The critical curvature is independent of gravity and other body force loads and reflects a fundamental compatibility condition of the in-plane mechanical strains.

Plates with sufficient symmetry experience bifurcation in their out-of-plane deformation at high mismatch strains and/or mechanical loads. In such cases the actual deformation path is controlled by initial geometric or material imperfections (e.g. small variations in thickness or materials properties, small deviations in composition, or small irregularities of the outer boundaries).

Note that the value of the critical curvature, equation (26), does not depend on gravity or mismatch strain; however, the critical mechanical force or moment at which bifurcation occurs is strongly influenced by both gravity and mismatch strain. There could be combinations of e and p that could make $f_e=0$, thereby keeping the plate essentially flat and circumventing the bifurcation problem altogether ($K_1=K_2\equiv0$). Such a situation may arise if the plate is clamped at the edges. Note also that the evolution of multiple curvatures and bifurcation is strongly influenced by the relative positions of the three support points with respect to the center of gravity of the plate, and the relative position of the different layers in the multilayered or graded plate (since the through-thickness variation of the thermal and mechanical properties is a function of the relative positioning of the layers).

Analytical Results for Circular Panels

The results obtained in Section 2.3 for the square plate (of side L) can be extended to a circular plate of radius R by replacing $L^2$ with $\pi R^2$. The constants $A_1, A_2, A_3, A_4$ and $A_5$ remain the same for the circular plate.

Key results for the circular plate are summarized as follows. The reaction forces are given by $$R_1 = \frac{p\pi R^2}{2[1+(\overline{a}/\overline{b})]}, R_2 = \frac{p\pi R^2(\overline{a}/\overline{b})}{1+(\overline{a}/\overline{b})}. \tag{27}$$

The load level is $$f_e = 2\langle E_{bi}\cdot(ez)\rangle - 2\frac{\langle E_{bi}\cdot e\rangle\cdot\langle E_{bi}\cdot z\rangle}{\langle E_{bi}\rangle} - \frac{\pi p}{12}R^2 + p\frac{\overline{a}(\overline{a}+\overline{b})+c^2}{1+\overline{a}/\overline{b}}. \tag{28}$$

The parameter D characterizes shape evolution as $$D=2A_3\pi^2R^4-4A_4^2(A_4-A_5)/f_e^2. \tag{29}$$

Initially, D<0, and the curvatures at the center of the circular plate are given by equation (21) with $$A_6 = \frac{(A_4+A_5)}{A_3\pi^2R^4}, A_7 = \frac{f_e}{A_3\pi^2R^4}. \tag{30}$$

The critical load level and the critical curvature at the point of bifurcation, D=0, are $$|f_e|_{cr} = 2|A_4|\sqrt{\frac{|A_4-A_5|}{2A_3\pi^2R^4}}, \tag{31}$$

$$|K_{cr}| = \sqrt{\frac{|A_4-A_5|}{2A_3\pi^2R^4}}. \tag{32}$$

After bifurcation, D>0, the curvatures at the center follow one of the possible modes of deformation, according to $$\frac{K_1}{f_e} = -\frac{1}{2A_4} \pm \frac{1}{2}\sqrt{\frac{D}{2A_3A_4^2\pi^2R^4}},$$

$$\frac{K_2}{f_e} = -\frac{1}{2A_4} \mp \frac{1}{2}\sqrt{\frac{D}{2A_3A_4^2\pi^2R^4}}. \tag{33}$$

Analytical Results for Rectangular Panels

Now consider the more general case of a rectangular plate, for which $L_x \ne L_y$. For the rectangular plate, use of the equilibrium equations from Section 2.2 modifies equations (19), (25) and (26) in the following manner:

$$D=A_3(L_x^4+L_y^4)-4A_4^2(A_4-A_5)/f_e^2. \tag{34}$$

$$|f_e|_{cr} = 2|A_4|\sqrt{\frac{|A_4-A_5|}{A_3(L_x^4+L_y^4)}}. \tag{35}$$

$$|K_{cr}| = \sqrt{\frac{|A_4-A_5|}{A_3(L_x^4+L_y^4)}}. \tag{36}$$

From these equations, it is seen that whenever $A_3(L_x^4+L_y^4)f_e^2 >> 64A_4^2|A_4-A_5|$ (which is the case when the plate is highly slender with $L_x>>L_y$), $D\approx A_3(L_x^4+L_y^4)$. Under these conditions, D>0, $|f_e|>|f_e|_{cr}$, and equation (20) becomes $$K_1 \approx -\frac{f_e}{A-4}, K_2 \approx 0. \tag{37}$$

which is the expected result from plane strain beam analysis. The above asymptotic result is in accord with the expected deformation in cases where one of the principal curvatures (i.e. the curvature in the long direction, $K_1$) dominates. This analytical prediction also reduces to the finite element results for rectangular plates undergoing large deformation in the absence of gravity.

Figure 5A:
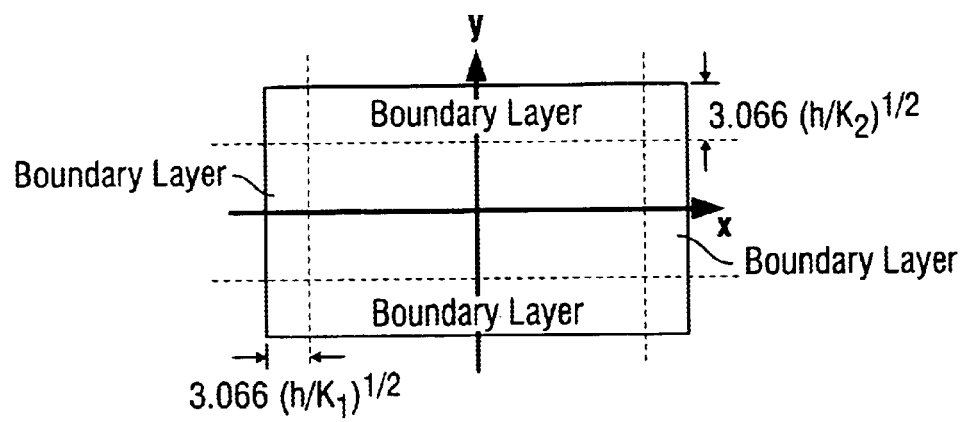
FIG. 5A shows development of a boundary layer for an orthogonal plate ($L_x > L_y$).

For D>0, $|f_e|>|f_e|_{cr}$, a boundary layer analysis can be carried out for the rectangular plate shown in FIG. 5a. Such an analysis (see Appendix B for details) provides predictions of curvatures along the length and width of the rectangular plate, as well as the dimensions of the boundary layer zones near the free edges of the plate. From the derivation given in Appendix B, the width of the boundary layer is found to be $$3.066\sqrt{\frac{h}{\min(|K_1|, |K_2|)}}$$

where $K_1$ and $K_2$ are the curvatures at the plate's center (x=0, y=0). Taking $K_1$ from equations (21) and (22) for the square plate and substituting $L=\sqrt{L_x L_y}$, provides the longitudinal curvature whereas the transverse curvature along the y-direction for the rectangular plate becomes $$K_2 \approx K_1 \frac{\langle E_{pe} \cdot \nu \rangle}{\langle E_{pe} \rangle}. \tag{38}$$

Figure 5B:
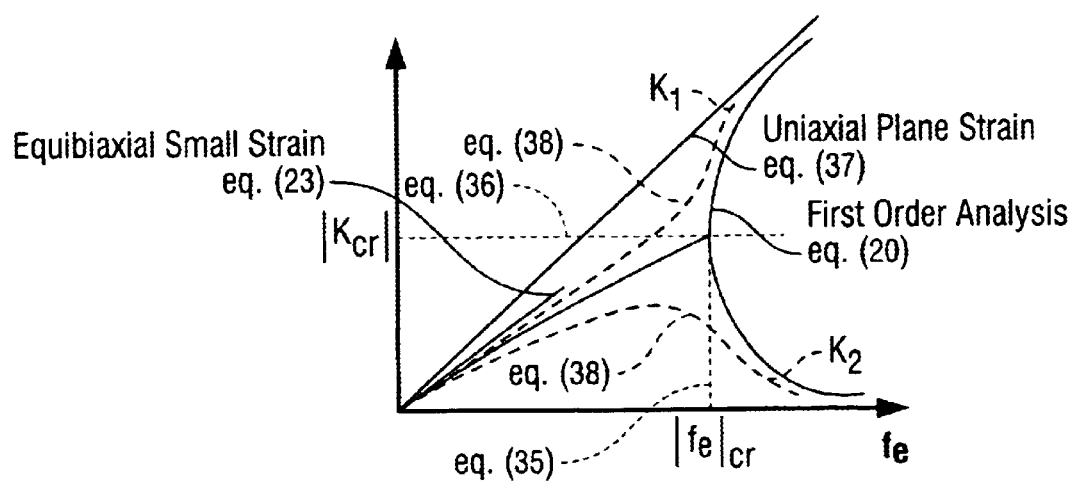
FIG. 5B shows stimulated evolution of curvature at the center (x=0, y=0) of the plate structure where a bifurcation occurs at a critical curvature.
Figures 6, 7:
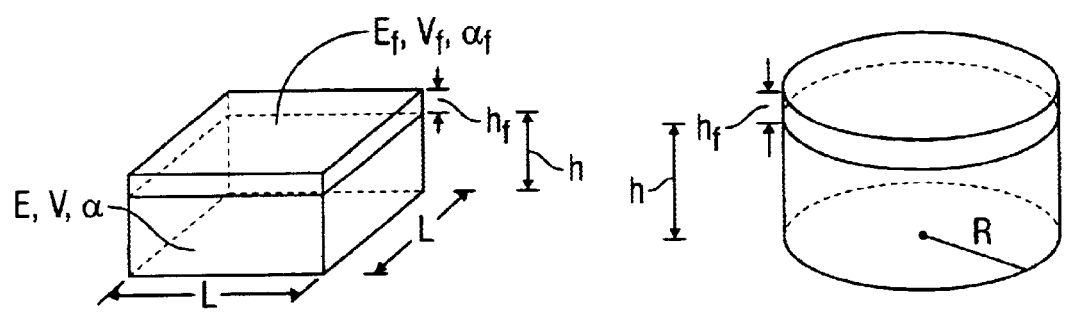
FIG. 6 shows a plate structure in a square geometry with a thin film formed on top.
FIG. 7 shows a plate structure in a circular geometry with a thin film formed on top.

The result is shown in FIG. 5b, with $K_1$ the maximum principal curvature along the longitudinal direction and $K_2$ the minimum principal curvature in the transverse direction.

The Limiting Case of Homogeneous Panels

Further simplifications can be made for plates with homogeneous elastic properties (where E and v are spatially invariant). In this case, equations (12), (13) and (15)–(17) reduce to $$A_1 = A_2 = 0, A_5 = \nu A_4 = \nu E_{pe} \frac{h^3}{6}, A_3 \tag{39}$$

$$= \frac{h}{1440} E_{pe},$$

The critical curvature for a square plate ($L_x = L_y = L$) then simplifies to $$|K_{cr}| = \frac{h}{L^2} \sqrt{120(1-\nu)}. \tag{40}$$

Note again that the critical curvature is independent of gravity and of the geometric and material properties of the film. The "critical load" simplifies to $$|f_e|_{cr} = \left| 2\langle E_{bi} \cdot (ex) \rangle - \frac{p}{12} L^2 + \frac{p}{(1+\bar{a}/\bar{b})} [\bar{a}(\bar{a}+\bar{b}) + \bar{c}^2] \right| \tag{41}$$

$$= \frac{E \cdot h^4}{3L^2(1-\nu^2)} \cdot \{120(1-\nu)\}^{1/2}$$

Analytical Limits for Thin Films on Substrates

Some useful analytical results can be extracted from the above general solutions for the case of a thin film on a substrate. FIG. 4 shows schematics of the square and circular substrates with thin film deposits.

The coefficient of thermal expansion, Young's modulus and Poisson ratio of the film are $\alpha_f$, $E_f$ and $\nu_f$, respectively, while those of the substrate are $\alpha$, E and v, respectively. The film thickness is $h_f$ while the substrate thickness is h.

Thin Films on Square Substrates

The critical curvature for a square substrate with a thin film is given again by equation (40). Since $h_f \ll h$, note that the film thickness, $h_f$, and the elastic properties of the film do not influence the result for the critical curvature, and that the results are identical to those derived in Section 2.6 for the homogeneous panels. In the thin film limit, the effective critical load, equation (41), reduces to $$|f_e|_{cr} = \left| e \frac{E_f h_f h}{(1-\nu_f)} - \frac{p}{12} L^2 + \frac{p}{1+\bar{a}/\bar{b}} [\bar{a}(\bar{a}+\bar{b}) + \bar{c}^2] \right| \tag{42a}$$

$$= \frac{E}{1-\nu^2} \frac{h^4}{3L^2} \sqrt{120(1-\nu)}.$$

Combining equations (40) and (41), the critical curvature can be written in terms of $|f_e|_{cr}$ as $$|K_{cr}| = \frac{3}{h^3} \frac{1-\nu^2}{E} |f_e|_{cr}. \tag{42b}$$

This result is a "Stoney-type" formula for large deformation where the critical curvature at bifurcation is explictly related to the critical effective loads. If deformation is induced only by thermal stresses (p=0), the corresponding critical eigenstrain is $$|e|_{cr} = |(\alpha - \alpha_1)\Delta T|_{cr} \tag{43}$$

$$= \frac{E(1-\nu_f)}{E_f(1-\nu^2)} \frac{h^3}{3L^2 h_f} \sqrt{120(1-\nu)}.$$

The above result is identical to that of Masters and Salamon in J. Appl. Mech., volume 61, page 872 (1994).

For the limiting case of very thin films, $h_f \ll h$, the small strain analysis reduces to the Stoney result (modified for equibiaxial stress):

$$K_{Stoney} = \sigma_i \frac{6(h_f + h)}{Eh^3/(1-\nu) + E_f h_f^3/(1-\nu_f)} \tag{44}$$

$$\approx \sigma_i h_f \frac{6(1-\nu)}{Eh^2},$$

where $\sigma_f = E_f e/(1-\nu_f)$ is the equibiaxial mismatch stress in the film. For the particular case of thermal mismatch stress, $$\sigma_f = \frac{E_f}{1-\nu_f} e = \frac{E_f}{1-\nu_f} (\alpha - \alpha_f) \Delta T. \tag{45}$$

The critical thermal stress in the film at the onset of bifurcation, from equation (42), becomes $$|\sigma_f|_{cr} = \frac{E_f}{1-\nu_t} |e|_{cr} \tag{46}$$

$$= \left| \frac{Eh^2 K_{cr}}{3(1-\nu^2)h_f} + \frac{pL^2}{2h_f h} - \frac{p[\bar{a}(\bar{a}+\bar{b}) + \bar{c}^2]}{h_f h[1+\bar{a}/\bar{b}]} \right|.$$

Thin Films on Circular Substrates

A circular substrate of radius R and thickness h with a thin film deposited on it ($h_f \ll h$) can also be analyzed using the results of Section 3.1 with $L_2 = \pi R_2$. The normalized critical curvature at bifurcation is $$\bar{K}_{cr} = K_{cr} \frac{R^2}{4h} = 0.8717 \sqrt{1-\nu}. \tag{47}$$

The critical curvature is independent of gravity and of the geometric and material properties of the film. Consequently, this result can be compared with the approximate, large deformation theory of homogeneous plates which gives the lower bound estimate: $\overline{K}_{cr}=0.5358$. If deformation is induced only by mismatch stresses (p=0), the corresponding normalized critical eigenstrain is $$|\overline{e}|_{cr} = |e|_{cr} \frac{3R^2 h_f E_f}{2h^3 E} = 1.7435\sqrt{1-v}. \quad (48)$$

Equations (47) and (48) are close to the results of Masters and Salomon in Int. J. Solids and Struct., volume 32, page 473 (1995) and Freund in J. Mech. Phys. Solids, volume 48, page 1159(2000):

$$R_{cr} = K_{cr} \frac{R^2}{4h} = \frac{1}{\sqrt{1+v}}, \quad (49)$$

$$|\overline{e}|_{cr} = \frac{2}{(1+v)^{3/2}}. \quad (50)$$

Figure 8:
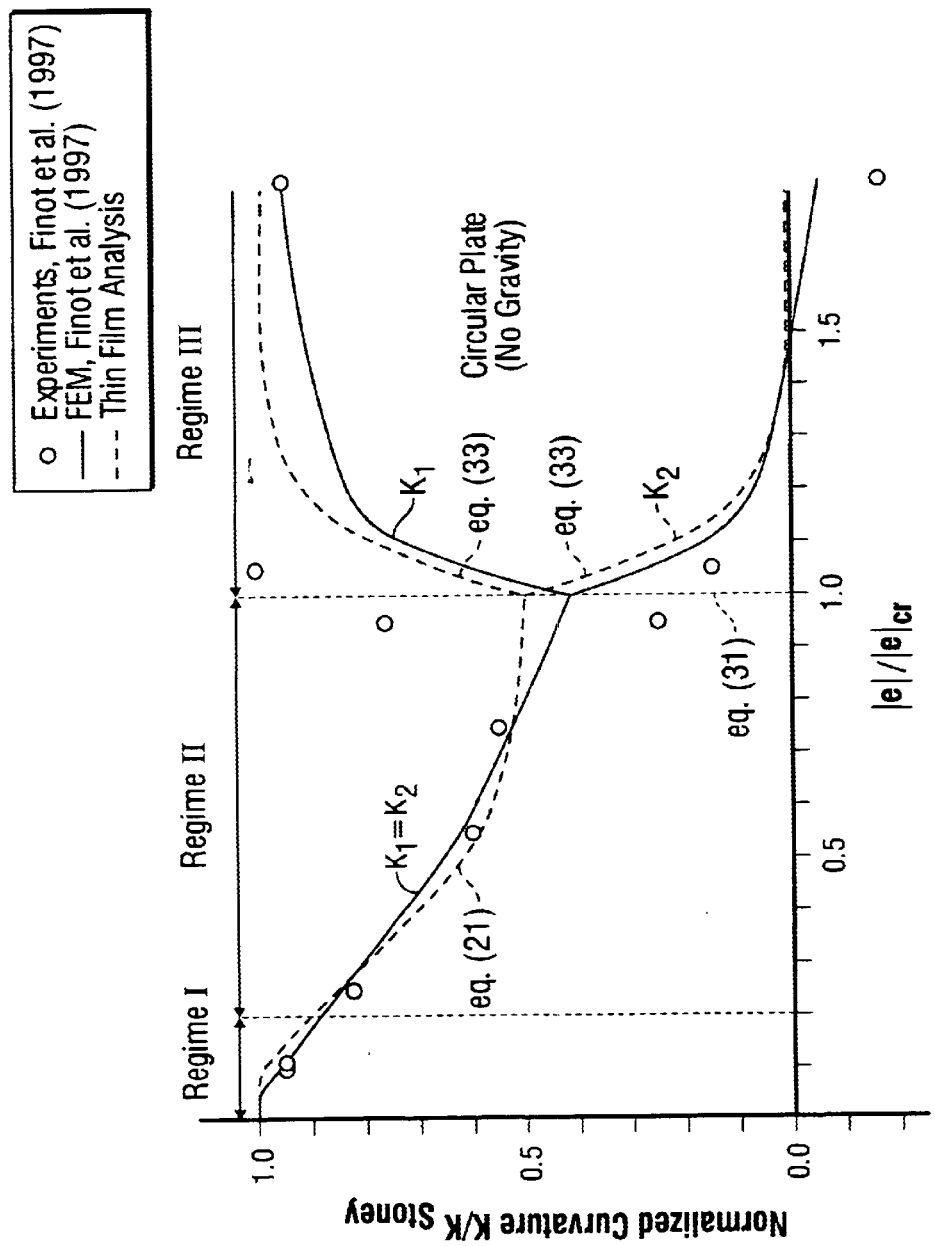
FIG. 8 shows measured data and associated simulated results of a particular circular plate structure based on both the present large deformation analytical method and the numerical finite element method where a small deformation regime I suitable for the Stony analysis, a large deformation regime II, and a bifurcated regime III under large deformation are shown.
Figure 11:
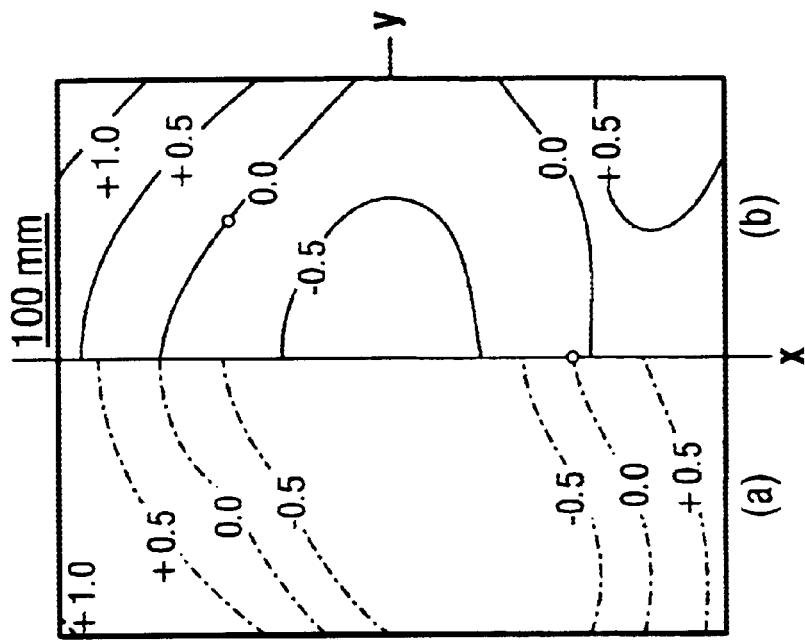
FIGS. 10, 11, 12, and 13 show comparison between the numerical finite element results and the results based on the large deformation analytical method of this invention.
Figure 10:
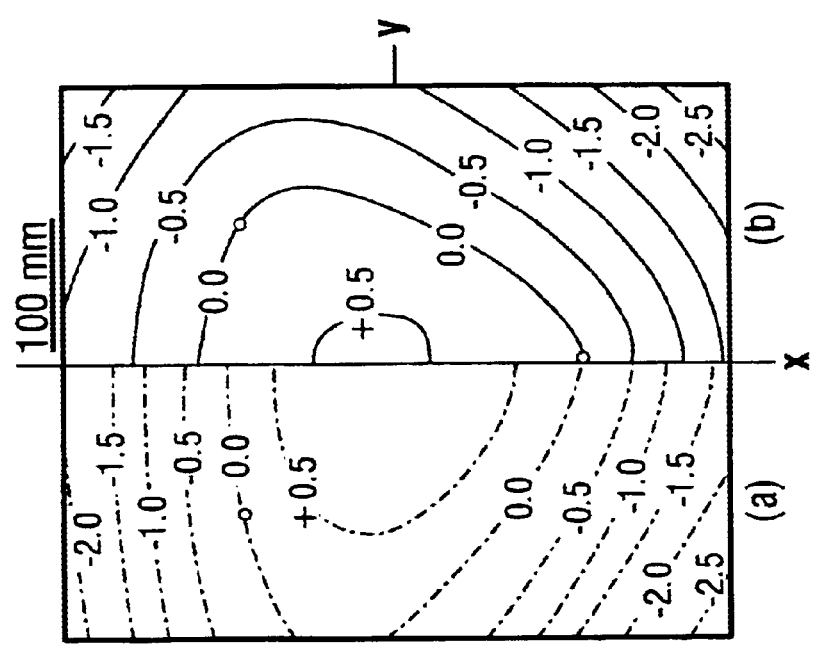
Figure 13:
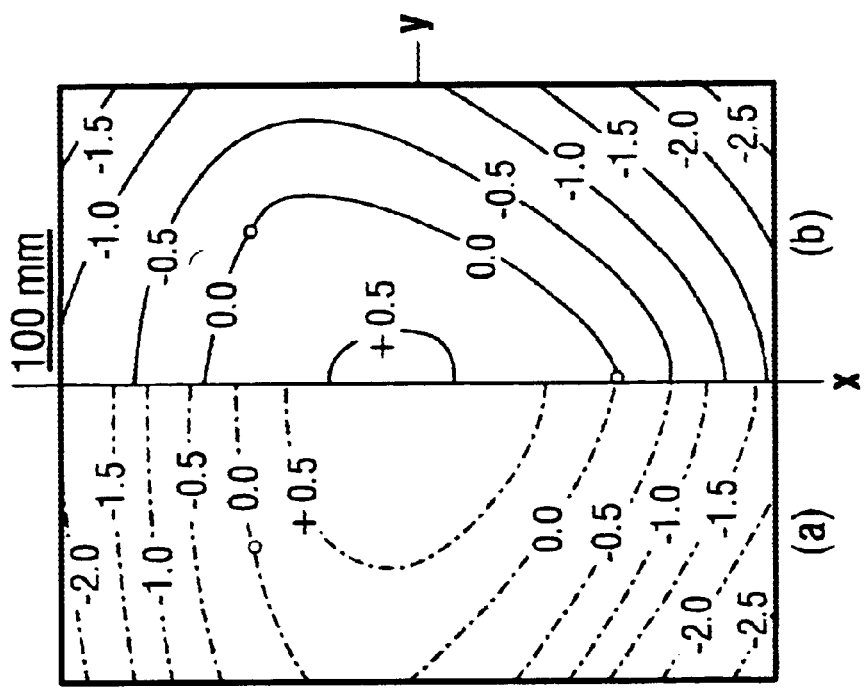
Figure 12:
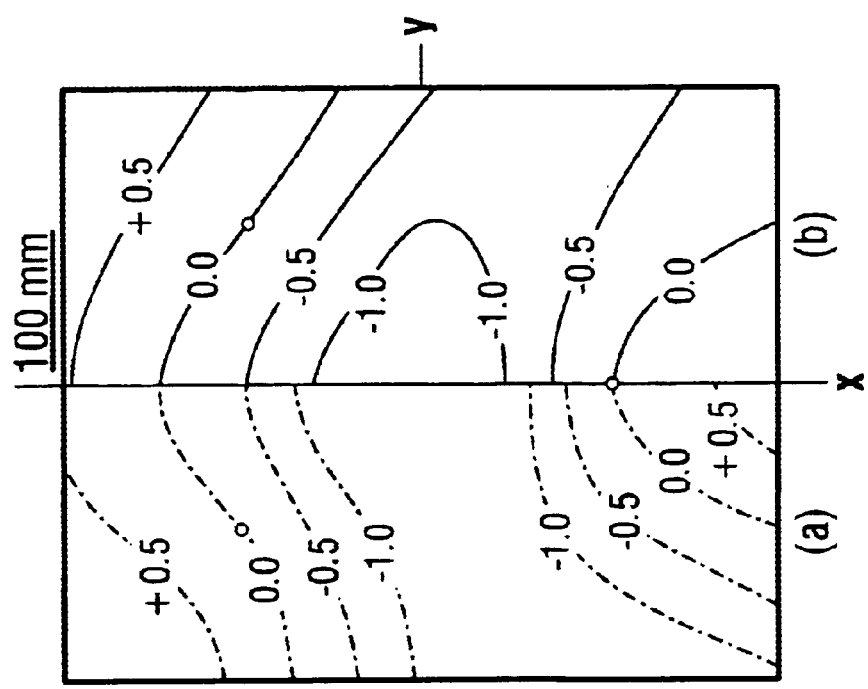

If the curvatures are normalized by the small deformation spherical curvature (i.e. the Stoney curvature, Stoney), and the eigenstrain by the critical strain, $|e|_{cr}$, then for a circular plate the universal evolution of the curvatures can be constructed, as shown in FIG. 8. FIG. 8 can be separated into three distinct regimes regarding the evolution of curvature with the film eigenstrain, e. In regime I, $0 \leq |e|/|e|_{cr} < 0.2$, the small strain (Stoney's) curvature is accurate within 10%. (For $0 \leq |e|/|e|_{cr} < 0.1$, Stoney's curvature is accurate within 5%.) In regime II, $0.2 < |e|/|e|_{cr} < 0.1$, there is a strongly non-linear relationship between the curvature and the eigenstrain. In regime III, $1 < |e|/|e|_{cr}$, the curvature bifurcates abruptly. At very large values of the eigenstrain, $|e|/|e|_{cr} > 2$, the deformation approaches that of a cylindrical shape with one principal curvature returning to the small strain Stoney's estimate and the other approaching zero. The directions of the principal curvatures are mutually orthogonal and depend strongly on the geometric and loading imperfections. At $|e|=|e|_{cr}$, $K_{cr}=0.5K_{Stoney}/(1+v)$.

Theory vs Experiment and Computation: Glass Panels
Experimental Methods

The influence of gravity on large deformation have been experimentally investigated using large rectangular glass panels with and without thin $Si_3N_4$ films deposited thereon. The films were of two different thicknesses, $h_f$=0.60 and 0.73 mm. The glass panels had rectangular shape of $L_x$=650 mm in length; $L_y$=550 mm in width; and h=1.1 mm in thickness.

Figure 9:
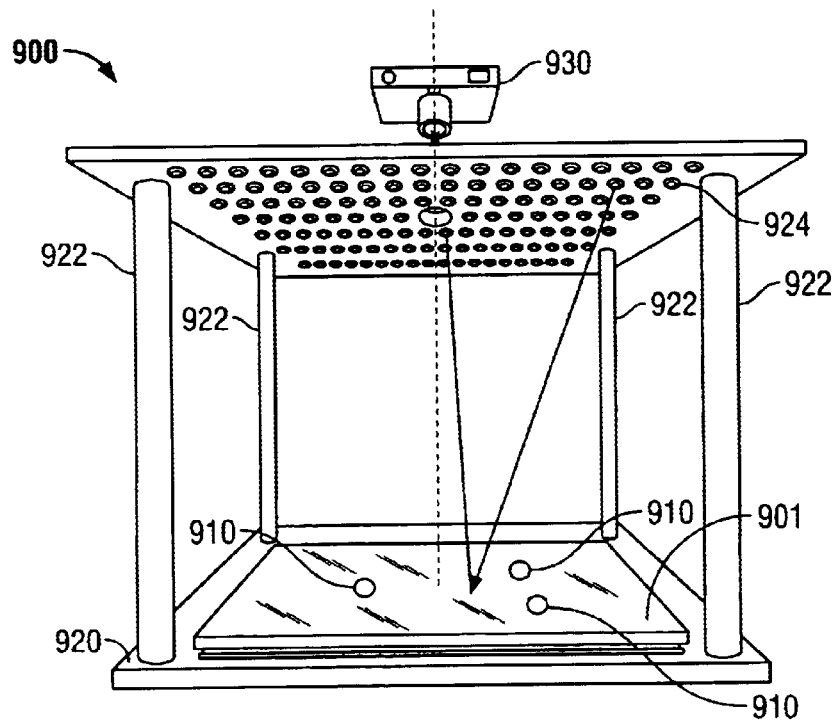
FIG. 9 shows one exemplary system for measuring large deformation of a glass panel.

FIG. 9 schematically illustrates one embodiment of a measuring system 900 where each glass panel 901 under measurement is arranged horizontally and are supported at three points 910 by support balls. The locations of the support points 910 are represented by parameters $\overline{a}$, $\overline{b}$ and $\overline{c}$ as illustrated in FIG. 3. A support base 920, such as an aluminum base, may be used to support the three steel support balls over which the glass panel 901 is placed. Support bars 922 are mounted on the support base 920 to hold a LED array 920 with LEDs in rows and columns that is above the glass panel (e.g., about 1 m) and in parallel to the glass panel 901 to illuminate the glass panel 901. The LED array 924 may have a central aperture and a camera 930, such as a digital camera with a CCD sensing array or other suitable sensing array, to capture the images of the central area of the glass panel 901 through the aperture. The digital camera 930 measures the positions of the reflected LEDs. The digital camera 930 is connected to a signal processing unit such as a computer which processes the captured data.

Table 1 summarizes information of two different glass panels #1 and #2. Note that h>>$h_f$, and as a result, the elastic properties of the film are not expected to influence the deformation characteristics considered here.

TABLE 1

Geometric configurations used with flat panel experiments

| Conf. | Film | | Substrate | | | Support | | |
|---|---|---|---|---|---|---|---|---|
| | | $h_f$ (μm) | h (mm) | $L_x$ (mm) | $L_y$ (mm) | $\overline{a}$ (mm) | $\overline{b}$ (mm) | $\overline{c}$ (mm) |
| #1 | #(a) | 0.60 | 1.09 | 650 | 550 | 117.8 | 152.4 | 152.4 |
| | #(b) | 0.73 | | | | | | |
| #2 | #(a) | 0.60 | 1.09 | 650 | 550 | 50.8 | 25.4 | 50.8 |
| | #(b) | 0.73 | | | | | | |

Since the large deformation response can be strongly influenced by the relative positioning of the layers, two different sets experiments were carried out: (a) the panel placed on three support points with the thin film side of the plate facing up (i.e. "film up", where the film is located at z=h/2), and (b) the panel placed with the thin film side of the plate facing down (i.e. "film down", where the film is located at z=−h/2). Relevant properties of the substrate and film are given in Table 2. In certain cases, a concentrated normal load P was applied at the center of the plate by placing weights.

The shape of the glass panels was measured using a modification of the "grid reflection technique" described in Finot et al. in J. Appl. Phys., volume 81, page 3457(1997). The panel was supported by three steel balls placed on an aluminum base (FIG. 9). A 17×23 array of pinholes, 0.41 mm diameter each, was fabricated in an aluminum plate which was subsequently black-anodized. A light emitting diode (LED) was placed behind each pinhole forming an LED array. The LED array, mounted parallel to the aluminum base (FIG. 9), was illuminated simultaneously. A digital camera, with a resolution of 1024×1368 pixels was used to capture the image of the diodes reflected from the glass panel. The dotted line in FIG. 9 shows the light path from one of the diodes being recorded by the digital camera.

The aberration of the camera lens was measured by photographing a ruled grid placed in place of the glass panel. The next step was to measure the position of the reflected diode images from the flat standard mirror which, again, was placed in place of the glass sample. The shape of the glass was calculated by comparing the reflections from the glass to those of the mirror.

Allowance was made for the change in reflecting angle due to vertical deformation by iterating the solution until a self-consistent set was achieved. This was done by first assuming no vertical deformation, finding the angles, calculating the vertical deformation and using those for a second calculation of angles from which a second set of deformation was obtained. It was found that the solution converged very rapidly and in all cases only one iteration was sufficient.

The panel was first tested without any film, and then with the thin film deposit. The tests were made in both "film up" and "film down" positions. The effect of gravity on the panel shape was subtracted by comparing the displacements in both positions (the glass shape was found by subtracting the displacements and dividing by 2). The panel thickness varied in plane by less than 20 µm, making such subtractions meaningful. It was found that all the panels were not flat but rather slightly twisted in such a way that when looking at the panel along its long axis, the right corner closer to the viewer was lower than the left corner, i.e. the short edge closer to the viewer had a negative slope, dropping down from the left to the right. Over the length of 650 mm, the twist was about 2.5 mrad, yielding a twist pitch of about 2.5 km.

Computational Simulations

The large deformation behavior of the panels were first analyzed by recourse to small-strain and small-rotation plate kinematics and the finite element method (FEM). The ABAQUS general purpose finite element code (version 5.5, 1996, Hibbitt, Karlsson and Sorenson, Pawtucket, R.I.) was used. The initial configuration was taken to be perfectly flat. During deposition, the thin film develops a uniform mismatch stress, $\sigma_f$. The value of the film stress was adjusted so that the computed displacements closely matched the experimentally obtained vertical deformation. With the acceleration due to gravity, g=9.81 m/s², the imposed mismatch stress was raised in increments until its magnitude produced deformation that matched all experimental observations.

rotations, superposition of loading is not permitted and the loading sequence is very important in the analysis (because the overall stiffness matrix was updated at the end of each loading step). For simultaneous imposition of mismatch strain and gravity, it was found that the analytical forms captured the computed values well. The numerical results exhibited the following general trends, in agreement with theory:

1. For panels that are supported farther away from the center (configuration #1), the principal curvatures at the center due to an applied concentrated normal force are nearly identical to the ones caused by the film being at the lower surface of the plate. In this case, the panel deformation is stable, and the curvatures do not change much with the magnitude of the concentrated load. The opposite is true with the film being at the upper surface of the plate. There is a sharp rise in curvature at about 2.33 N indicating the onset of an instability. In conclusion, the configuration with the supports away from the panel's center is very sensitive to the direction of gravity, as anticipated from theory, equation (18).

2. When the support points are closer to the panel's center (configuration #2), deformation is cylindrical (curved along the longest side of the plate), as predicted by the analysis, equation (37). With the film being on the upper surface of the panel, the overall deformation is anticlastic, provided that the film is in tension. The curvature change due to the mismatch stress in the film does not depend strongly on the position of the film at the upper or lower surface of the panel because the gravity load dominates and forces the panel to maintain an essentially cylindrical shape. Additional simulations involving three-dimensional finite element discretization were conducted in order to check the validity of

TABLE 3

| | Reactions due to self weight | | | | | |
|---|---|---|---|---|---|---|
| | $R_1$ (N) | | $R_2$ (N) | | $2R_1 + R_2$ (N) | |
| Support | FEM | Analytical equation (8a) | FEM | Analytical equation (8b) | FEM | Anayltical |
| #1 | 3.519 | 3.517 | 3.520 | 3.517 | 10.558 | 10.550 |
| #2 | 2.808 | 2.840 | 4.812 | 4.869 | 10.428 | 10.550 |

Due to the possibility of asymmetry in deformation, the entire plate was modeled ($L_y/2 \geq y \geq -L_y/2, L_x/2 \geq x \geq -L_x/2$). The mesh used four-noded plate elements, and each node included three midplane displacements and two mid-plane rotational degrees of freedom. The plate elements allowed deformation across the thickness due to Poisson effect. Successive mesh refinements resulted in a mesh of 392 four-noded elements and 453 nodes, almost uniformly distributed in the panel, at which point convergence was deemed acceptable. The accuracy of the numerical calculations was assessed by comparing the FEM and the analytic reactions due to gravity, equation (8), in Table 3. Gravity and mismatch strain were applied simultaneously in 10 equal increments. The normal load, P, was applied sequentially at the center of the panel in selected cases. The computations revealed many possible deformation patterns and the one which minimized the energy was accepted as the result. It is important to emphasize that due to the presence of moderate various hypotheses of the analysis. These analyses allowed for hyperelastic deformation with large strains and-large rotations, whereas the foregoing two-dimensional models dealt with hypoelastic response for small strains and moderate rotations. The hypoelastic and hyperelastic results are essentially the same for sufficiently thin plates (h/max($L_x$, $L_y$)<0.05). The hypoelastic results underestimate the hyperelastic ones by no more than 3%, especially for relatively thick plates. The analytical results were within 7% of the computed results, even for moderately thick plates (h/max (Lx, Ly)<0.1). From the finite element results, it was verified that the shear stresses are essentially zero (typically a thickness distance away from the free edges) prior to the occurrence of bifurcation, and that an equalbiaxial stress state dominates ($\sigma_x \approx \sigma_y$). After bifurcation, with the plate curling around the x axis, the Cauchy shear stress is of the order $\delta_{xy} \approx \sigma_x/10$ and ($\sigma_y \approx \sigma_x/2$.

TABLE 4

Load due to weight only (configuration #1)

| Coordinates (mm) | | Vertical displacements $w^{\circ}$ (mm) | |
|---|---|---|---|
| x | y | Experiments | FEM |
| 0 | 0 | +0.52 | +0.96 |
| 325 | 0 | −1.53 | −1.35 |
| 325 | 275 | −3.01 | −2.57 |
| 0 | 275 | −1.00 | −1.25 |
| −325 | 275 | −1.80 | −1.75 |
| −325 | 0 | −1.00 | −1.48 |

Curvatures at the center of the plate (x = 0, y = 0)

| $K_1$ (m$^{-1}$) | | $K_2$ (m$^{-1}$) | |
|---|---|---|---|
| Experiments | FEM | Experiments | FEM |
| −0.0551 | −0.0561 | −0.0201 | −0.0217 |

Comparison with Finite Element Results

Finite element computations are compared with experimental results in Tables 4–7, and in FIGS. 10–13. Various observations made in the experiments are seen to compare favorably with calculations. As anticipated, the results seem to be particularly sensitive to loading and geometric perturbations for configuration #1 where the supports are farther away from the center of gravity of the panel than in configuration #2.

TABLE 6

Load due to weight and film down (configuration #1(a))

| Coordinates (mm) | | Vertical displacements $w^{\circ}$ (mm) | |
|---|---|---|---|
| x | y | Experiments | FEM |
| 0 | 0 | −0.77 | −0.83 |
| 325 | 0 | +0.50 | +0.91 |
| 325 | 275 | +0.00 | +0.48 |
| 0 | 275 | −0.10 | −0.29 |
| −325 | 275 | +1.42 | +1.00 |
| −325 | 0 | +0.75 | +0.80 |

Curvatures at the center of the plate (x = 0, y = 0)

| $K_1$ (m$^{-1}$) | | $K_2$ (m$^{-1}$) | |
|---|---|---|---|
| Experiments | FEM | Experiments | FEM |
| +0.0701 | +0.0621 | +0.0191 | +0.0104 |

Figure 14:
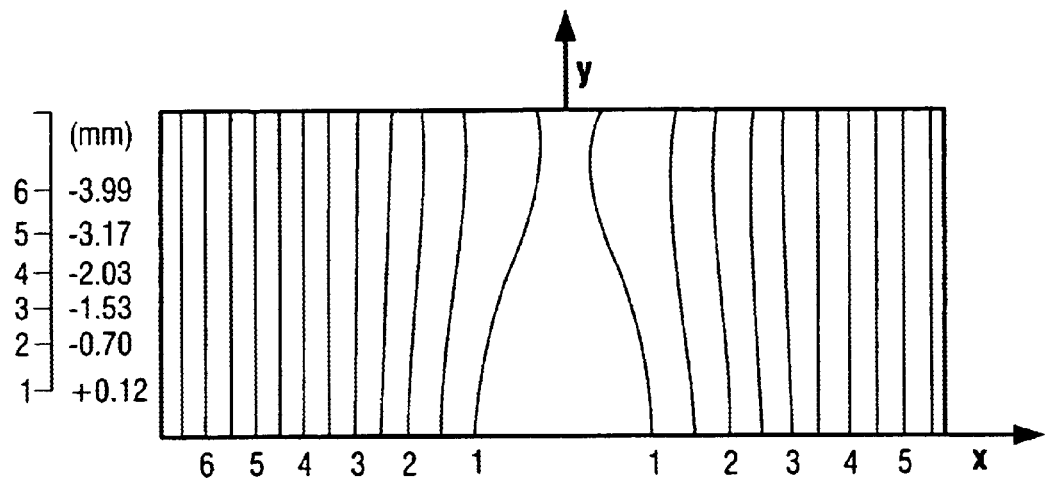
FIGS. 14 and 15 show finite element computation results of the vertical displacement contours in mm in cases with weight only and with both the weight and the deposited film, respectively.
Figure 15:
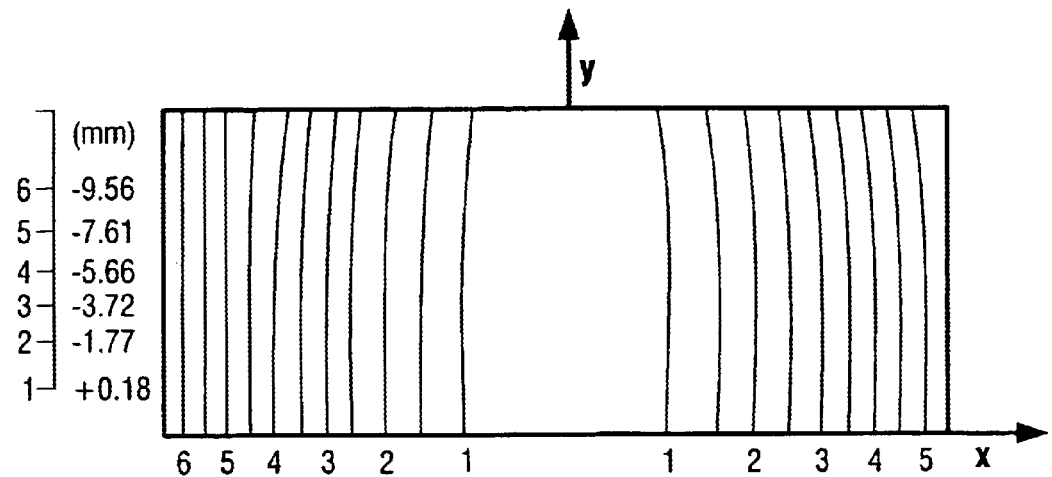

Configuration #2 becomes cylindrical due to self weight as predicted by the theoretical analysis and confirmed by both by experiments and FEM, FIGS. 14 and 15. The initial cylindrical configuration dominates the overall deformation. Since it is a stable configuration, this is the only case where superposition of loading can be applied. In this case, the flat panel deform, as if it were a wide beam, under the influence of eigenstrains (compare FIG. 14 and FIG. 15). The influence of P on the overall out-of-plane plate deformation is negligible in this case because the supports are close to the center of application of P.

TABLE 7

Load due to weight and film up (configuration #1(a))

| Coordinates (mm) | | Vertical displacements $w^{\circ}$ (mm) | |
|---|---|---|---|
| x | y | Experiments | FEM |
| 0 | 0 | +0.79 | +0.38 |
| −325 | 0 | −1.50 | −1.06 |
| −325 | 275 | −4.84 | −4.96 |
| 0 | 275 | −1.50 | −2.09 |
| −325 | 275 | −1.00 | −1.48 |
| −325 | 0 | −0.50 | −0.45 |

Curvatures at the center of the plate (x = 0, y = 0)

| $K_1$ (m$^{-1}$) | | $K_2$ (m$^{-1}$) | |
|---|---|---|---|
| Experiments | FEM | Experiments | FEM |
| +0.0291 | +0.0238 | +0.0661 | +0.0951 |

Configuration #1 was used to predict the critical concentrated load, $P_{cr}$, that causes the panel to buckle; note that the panel already deformed due to gravity and residual stress in the film. Following the buckling analysis of a shallow spherical shell by Biezeno and Grammel, a closed form expression for the critical load could be derived:

$$P_{cr} \approx 0.918 E h^3 K; \quad (K \approx K_1 \approx K_2 > 0). \tag{51}$$

Assuming that the plate (with supports away from the center) has undergone an almost equibiaxial curving ($K \approx K_1 \approx K_2 > 0$) due to gravity and/or thermal strains, a subsequent application of a normal load $P = P_{cr}$ causes buckling of the initially deformed configuration (the already deformed panel snaps to a curvature of 0.64 K, i.e the deformed plate becomes flatter). The analytical results from equation (51) compare very well with experiments, as shown in Table 8.

TABLE 8

Influence of concentrated load P and weight only (configuration #1)

| | P (N) | | K (m$^{-1}$) | |
|---|---|---|---|---|
| Condition | Analysis | Experiments | Analysis | Experiments |
| Initial | 0 | 0 | −0.0430 | −0.0398 |
| Bifurcation | 2.30 (= $P_c$) | 2.24 | −0.0275 | −0.0268 |

The film stresses, $\sigma_f$, are given in Table 9. They were computed by successive increments in order to capture best the experimental surface deformation in all cases (film up or down) and support configurations, as described in Table 1. Experimental estimates of the film stresses due to deposition and in the absence of gravity are also given for comparison.

TABLE 9

Film stresses

| Configuration | $\sigma_t$ (MPa) Estimates from depositions on Si in the absence of gravity | FEM |
|---|---|---|
| #1(a) | 370 | 315 |
| #2(b) | 560 | 560 |

The Gauss curvature of the plate (i.e. the mean curvature, $(K_1+K_2)/2$) is invariant with respect to the deformation path and depends only on the final loading conditions. For panels with widely spaced supports (configuration # 1) and without thin-film deposits, gravitational loading gives $(K_1+K_2)/2$=−0.0376 1/m. For the same support configuration but with the film down (film #1(a)), $(K_1+K_2)/2$=0.0446 1/m. For the same configuration, but with the film up, $(K_1+K_2)/2$=−0.0476 1/m. Taking the difference, the Stoney formula, equation (1), predicts that the film stress is $\sigma_f$=322 MPa for the film up case, and that $\sigma_f$=2650 MPa for the film down case. The actual value was computed to be $\sigma_f$=315 Mpa (tensile). Note that the Stoney estimate for the film up case is close to the computed value because, in this configuration, the film stress produces curvatures similar to those seen under gravitational loading. However, the Stoney result for the film down case is completely out of range. This example thus illustrates the important role of the body force on the deformation of thin films on slender plates.

EXAMPLE
Thin Film on SI Substrate

Finot et al. reported curvature measurements on circular Si wafers (diameter, 2R=150 mm, and thickness, h=337.5 μm), on which thin films of Al—Cu ($h_f$=0.5 μm) or W ($h_f$=0.9 μm) were deposited. Finot et al., Journal of Applied Physics, Volume 81, page 3457 (1997). The elastic properties of Si are: E=130 GPa, v=0.28, and its density, ρ=2.33 g/cm². For comparison of their results with the present theory, we use a square cross-section with an equivalent length, L=132.9 mm, which gives the same surface area as that of the circular wafer. Note that the properties of the thin film do not enter in this analysis. Equation (40) gives a critical curvature of 0.133 m$^{-1}$, which compares well with the experimentally measured value of 0.14 m$^{-1}$ in Finot et al. Neglecting gravity leads to errors of less than 4% in this case. The experimental values of the curvatures were in good agreement with the analytical results of thin films, as shown in FIG. 4 of the cited article by Fiont et al.

Lee et al. experimentally studied the variation of curvature in thin Al films ($h_f$=6 μm) deposited on thin circular, Si wafers (h=105 μm and v=0.22) of radius, R=25.4 mm, using the coherent gradient sensor technique for monitoring curvature. Journal of Applied Physics, Volume 89, page 6116 (2001). These wafers were subjected to thermal loading histories. The geometry here is such that effects of gravity on large deformation can be ignored. During cooling from the film deposition temperature, they observed curvature bifurcation at ΔT=−22.5° C.

Figure 16:
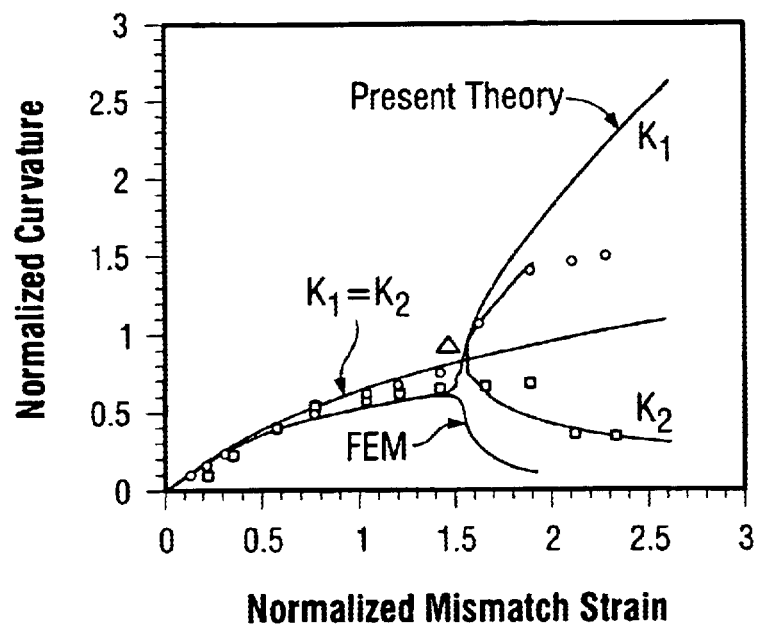
FIG. 16 shows comparison of the results of the present large deformation analytical method and experimental results by Lee and Rosakis of California Institute of Technology.

FIG. 16 shows the predictions of the present theory with the computational and experimental results of Lee et al. as cited above. Setting p=0 to remove the effects of gravity, this figure shows the normalized curvature, $\bar{K}$=KR²/(4 h), with the normalized mismatch strain, $\bar{e}$=3eR² $h_f E_f$/(2 h³E), for the materials and geometries used in Lee et al. in J. Appl. Phys., volume 89, page 6116 (2001). Note that the predictions of the present theory compare well with both the experiments and finite element simulations for the Al film on Si substrate, both before and after bifurcation. Note also that the point of bifurcation, as predicted by the present theory, equations (47) and (48), matches the result of refs. Salamon et al. in Int. J. Solids and Struct., Volume 32, page 473 (1995) and Freund in J. Mech. Phys. Solids, Volume 48, page 1159 (2000).

The above description provides a detailed analysis of the effects of gravity on the large deformation characteristics of thin films and layered/graded flat panels subjected to combined thermal and mechanical loading. Small strains and moderate rotations were assumed for the analysis. The material properties and the eigenstrains were allowed to vary arbitrarily in the thickness direction. Approximate solutions were derived using energy minimization methods. The possibility of curvature bifurcation was examined and explicit closed form solutions were derived for the critical curvature and the critical effective load at bifurcation. An interesting result from the analysis is that the critical curvature does not depend on mismatch strain and gravity. On the other hand, the critical effective load level is affected by the curvature convexity with respect to the direction and magnitude of gravity, and of the concentrated load (reactions from the supports and concentrated load applied at the center of gravity). Large deformation solutions with gravity were also examined for the limiting cases of homogeneous flat panels and thin films on substrates.

Compatibility required consideration of a boundary layer to model deformation close to the edges of the plate. The boundary layer analysis was based on the theory of developable surfaces and the Poisson coupling of the principal curvatures. The closed form predictions of bifurcation and boundary layer methodology were compared with large rotation finite element analysis of plates, as well as 3-D hyperelastic analysis. In all cases, the analytical forms were found to be in qualitative and quantitative agreement with the computational results, and were found to capture all essential features of the problem.

A series of systematic experiments was conducted on flat panels with and without thin film deposits in order to assess the validity of the present theory. It was found that the predicted trends for the evolution of curvature and bifurcation were consistent with theory. In addition, the radial distribution of experimentally measured displacements/curvatures in the panels with different geometrical arrangements of supports and films, were in reasonable agreement with the computational results. Available experimental results on large deformation of thin films on Si substrates also compared very favorably with the present analytical results.

The following describes the effect of concentrated applied normal force in a plate structure under the large deformation analytical method. A normally applied load, P, concentrated at the plate's center of gravity can additionally be included in the present analysis, as indicated in FIGS. 3 and 4. The reaction forces at the simple supports can be found from simple equilibrium:

$$R_1 = \frac{P + pL_xL_y}{2[1+(\bar{a}/\bar{b})]}, R_2 = \frac{(P+pL_xL_y)(\bar{a}/\bar{b})}{1+(\bar{a}/\bar{b})} \tag{A1}$$

The total potential energy, V, is $$V = \int_{-L_y/2}^{L_y/2}\int_{-L_x/2}^{L_x/2}\int_{-h/2}^{h/2}\frac{1}{2E}(\sigma_x^2+\sigma_y^2-2\nu\sigma_x\sigma_y+ \quad\quad (A2)$$

$$2(1+\nu)\sigma_{xy})dzdxdy + \frac{pL_xL_y}{24}(K_1L_x^2+$$

$$K_2L_y^2) - \frac{P+pL_xL_y}{2(1+a/b)}[K_1\bar{a}(\bar{a}+\bar{b})+K_2\bar{c}^2]$$

The solution follows the same general approach as in the main text with:

$$f_e = 2\langle E_{bi}\cdot(ez)\rangle - 2\frac{\langle E_{bi}\cdot e\rangle\cdot\langle E_{bi}\cdot z\rangle}{\langle E_{bi}\rangle} - \frac{p}{12}L^2 + \quad\quad (A3)$$

$$\left\{p+\frac{p}{L^2}\right\}\left\{\frac{\bar{a}(\bar{a}+\bar{b})+\bar{c}^2}{1+\bar{a}/\bar{b}}\right\}.$$

The subsequent results of $f_e$ for the particular cases given in the text can be modified according to equation (A3).

The effect of a boundary layer in a plate structure may also be analyzed with the above large deformation analytical method. Finot and Suresh in J. Mech. Phys. Solids Volume 44, page 683 (1996) verified the predictions of Salamon and Masters in Inte. J. Solids and Struct., Volume 32, page 473(1995) that the curvature of a rectangular plate under residual stresses is not uniform over the length or the width of the plate. They further showed that, for $L_x > 6\sqrt{h/K_{cr}}$, the solution of the generalized plain strain problem gives a good approximation for the curvature in the longer direction of the rectangular plate. These results essentially describe a boundary layer phenomenon that takes place during the large deformation of thin plates. The boundary layer is a region near the edges of the plate where the deformation can be determined approximately by neglecting the flexural rigidity and assuming that only membrane stresses develop. This approximation is valid if the out-of-plane deflection is larger than the plate's thickness. The non-linear effects of the membrane stresses are confined only to the boundary layers, outside of which the behavior follows small strain plate theory. Here we adopt the boundary layer analysis using the methods developed by Fung and Wittrick for homogeneous plates.

Suppose that a rectangular plate undergoing large deflections develops boundary layers, as shown in FIG. 5a. Without loss of generality, we concentrate on the free edge along $y=-L_y/2$. The applied axial forces and moments at the edges are zero. Another coordinate system X, Y, Z, attached to the edge, is taken to be parallel and perpendicular to the generators of the cylindrical surface. The coordinate transformation between the initial system and the new system is $Y=y+L_y/2$, $X=x$ and $Z=z$. The radius of curvature along the X-direction is $1/K_1$. In the boundary layer, only the normal and shear membrane forces per unit length ($N_X$, $N_Y$ and $N_{XY}$) are required to satisfy equilibrium. Let $Y_{BL}$ be the width of the boundary layer. The total out-of-plane deflection of the plate is partitioned as $$w^0 = w^* + \zeta \quad\quad (B1)$$

where $\zeta$ is the departure from the cylindrical form of deformation $w^*$. The cylindrical part of deformation, $w^*$, satisfies equilibrium in the Z-direction. In the boundary layer, equilibrium in the X and Y direction is satisfied if $$N_X = -\langle E\rangle\zeta K_1, N_Y = 0. \quad\quad (B2)$$

To complete the solution, we use the regularity condition $\zeta\to 0$ at $Y\to +\infty$ and at $Y\to 0$ the moment and shear forces, as derived from the small strain theory must be zero (cylindrical solution). Then $$\zeta(Y) = C_1 e^{-\delta Y}(\sin(Y\delta) - \cos(Y\delta)), \quad\quad (B3)$$

with $$C_1 = \frac{\langle E_{p\varepsilon}\cdot\nu\rangle K_1}{2\delta^2\langle E_{p\varepsilon}\rangle}, \quad\quad (B4)$$

and the boundary layer strength $$\delta^4 = \frac{\langle E\rangle K_1^2}{4\langle E_{p\varepsilon}\cdot z^2\rangle} \quad\quad (B5)$$

The maximum absolute value of $\zeta$ is at the free edge, $\zeta(0) = -C_1$. The membrane tension $N_X$ in the boundary layer combined with the longitudinal curvature provides an effective force $K_1 N_X$ per unit are in the direction perpendicular to the edge. These membrane tensions produce a lateral bending moment given by $$M_y = -K_1\frac{\langle E_{p\varepsilon}\cdot\nu\rangle}{\langle E_{p\varepsilon}\rangle}\langle E_{p\varepsilon}\cdot z^2\rangle. \quad\quad (B6)$$

Recalling that $M_y = -K_2\langle E_{p\varepsilon}\cdot z^2\rangle$, equation (B6) leads directly to equation (38). Therefore, the important function of the boundary layer is to provide a lateral bending moment in the cylindrical middle region sufficient to inhibit lateral curvature.

To find the depth of the boundary layer, we take the point $Y_{BL}$ of the second zero of the $\zeta(Y)$ function given by equation (A3). The width of the boundary layer decreases as $\nu\to 0$, or for low values of $\delta$ (e.g. small radius of curvature $1/K_1$) and increases as $\nu\to 0.5$, or for high values of $\delta$ (e.g. large radius of curvature $1/K_1$). For $\nu=0.33$, $Y_{BL}=3.066\sqrt{h/K_1}$. If min $L_x, L_y \leq 2Y_B$, the boundary layer completely dominates the solution and the rectangular plate behaves as a beam, in accord with the numerical result of Finot and Suresh as cited above.

The above sections describe various features of the large deformation analytical method. The following further describes one application of the above method.

Figure 17:
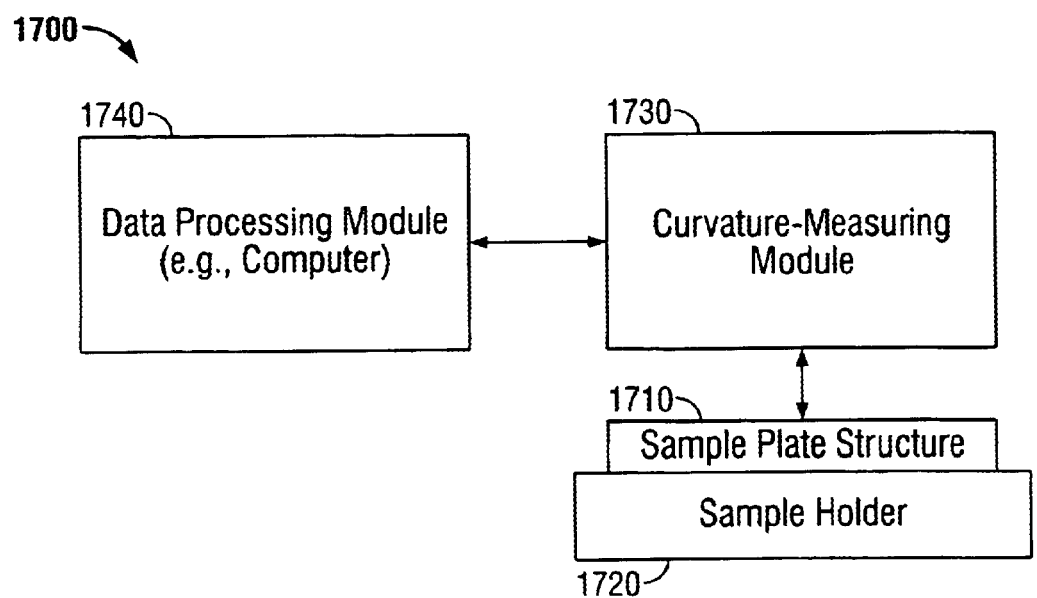
FIG. 17 shows a measuring system based on the large deformation analytical method according to one embodiment.

FIG. 17 shows one embodiment of a real-time sample monitor system 1700 based on the above large deformation analytical method. The system 1700 includes a sample holder 1720 to support and hold a sample layered or graded plate device or structure 1710. In some applications, such as film deposition in semiconductor processing, the sample holder 1720 may include an enclosed chamber under a vacuum condition. A curvature-measuring module 1730 is used to measure the sample 1710 in real time so that the curvature measurement may be completed in a duration less than the period over which the thermal and mechanical conditions of the sample 1710 have significantly changed. A data processing module 1740, e.g., a microprocessor or other digital processing device, may be coupled to receive the information on the measured curvatures from the module 1730 and programmed to carry out the computations and analysis based on the above large deformation analytical method, without complex numerical computations.

The curvature-measuring module 1730 may be implemented in various configurations. Exemplary implementations include a scanning laser system where a laser beam is scanned through a surface to measure the curvatures, a multibeam optical sensing system, and an optical grid reflection system. Such optical systems are non-invasive and hence can preserve the measured surface.

Preferably, the probing mechanism of the curvature-measuring module 1730 can perform a full-field measurement on the curvatures in the entire area under measurement to obtain curvatures of all locations within the measured area at the same time, without the conventional point-to-point scanning measurement. This combination of the full-field curvature detection and the fast analytical processing of the large deformation analytical method can produce a spatial map of the stress distribution in the area under measurement in virtually real time so long as the change in the stress is slower than the processing time.

The module 1730 may be an optical detection module which produces and directs an illumination optical beam to a surface of the sample 1710, and then receives and detects the reflected or scattered beam. One example of optical implementation of the module 1730 is a coherent gradient sensing ("CGS") system disclosed in U.S. Pat. No. 6,031,611 to Rosakis et al. FIG. 17 illustrates one embodiment of the CGS system 1700 which uses a collimated coherent optical beam 112 from a light source 110 as an optical probe to obtain curvature information indicative of a specularly reflective surface 130 on the sample 1710 in FIG. 17. The light source 110 may be a coherent light source such as a laser or an incoherent light source such as a white light source which produces a while light beam. An optical element 120 such as a beam splitter can be used to direct the beam 112 to the surface 130. When the reflective surface 130 is curved, the wavefront of the reflected probe beam 132 is distorted and thereby the reflected probe beam 132 acquires an optical path difference or phase change associated with the curvature of the surface 130 under measurement. This system produces a "snapshot" of each point within the illuminated area on the surface 130 and hence the curvature information at any point along any direction within the illuminated area can be obtained. This approach can eliminate the need for measuring one point at a time in a sequential manner by using a scanning system.

Two gratings 140 and 150 spaced from each other are placed in the path of the reflected probe beam 132 to manipulate the distorted wavefront for curvature measurement. Two diffraction components produced by the second grating 150 diffracting two different diffraction components produced by the first grating 140 are combined, by using an optical element 160 such as a lens, to interfere with each other. The diffraction by the two gratings 140 and 150 effectuates a relative spatial displacement, i.e., a phase shift, between the two selected diffraction components. This phase shift is a function of the spacing between the two gratings 140 and 150 when other grating parameters are fixed. A spatial filter 170 is placed relative to the optical element 160 to transmit the interference pattern of the selected diffraction components and to block other diffraction orders from the second grating 150.

The transmitted interference pattern is then captured by an imaging sensor 180 which may include an array of sensing pixels, such as a CCD array, to produce an electrical signal representing the interference pattern. A signal processor 190, which may be part of the processing module 1740 in the system 1700 in FIG. 17, processes the electrical signal to extract a spatial gradient of the phase distortion caused by the curvature of the reflective surface 130. This spatial gradient, in turn, can be further processed to obtain the curvature information and hence a curvature map of the illuminated area on the surface 130 can be obtained. A single spatial differentiation is performed on the interference pattern to measure the surface gradient. This technique can provide accurate measurements of surface curvatures when the curvature variation of the surface is gradual, i.e., when the out-of-plane displacement is less than the thickness of the film, the line or the substrate. This technique is insensitive to rigid body motion and surrounding vibrations in comparison with some other interferometric techniques because there is no external reference beam needed for producing the interference pattern and the CGS system uses the two gratings 140 and 150 to produce its own reference for interference.

The two gratings 140 and 150 in general may be any gratings, with different grating periods and oriented with respect to each other at any angle. Preferably, the two gratings may be oriented with respect to each other in the same direction and may have the same grating periods to simplify the data processing. In this case, the grating direction is essentially set by the direction of the relative spatial displacement ("shearing") between the two selected diffraction components due to the double diffractions by the gratings 140 and 150.

Figure 18:
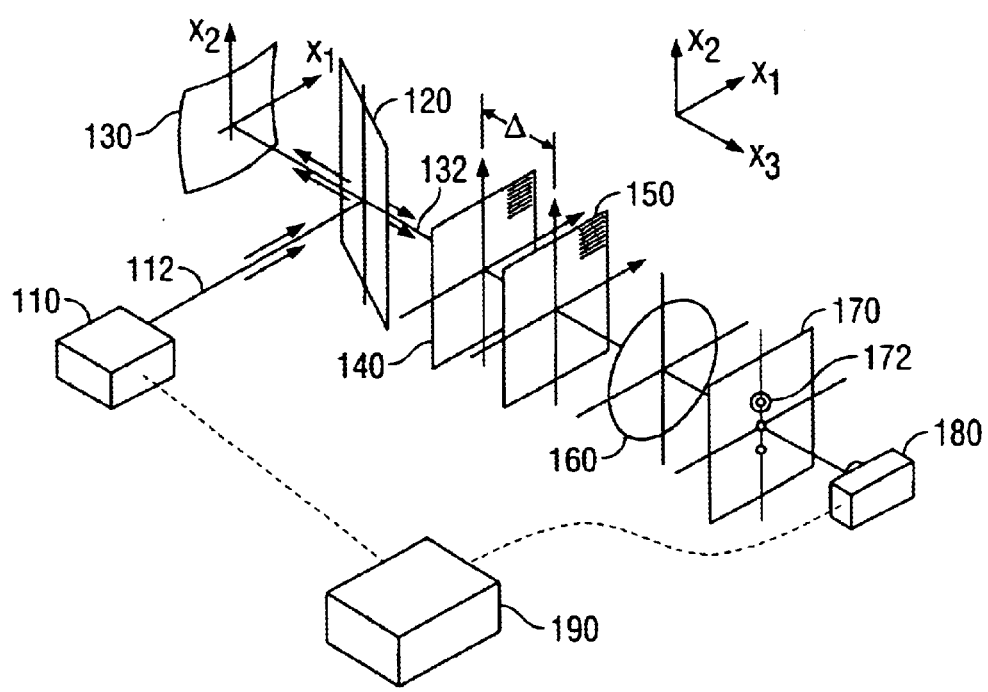
FIG. 18 shows an optical full-field coherent gradient sensing (CGS) system as one implementation of the curvature-measuring module in FIG. 17.
Figure 19:
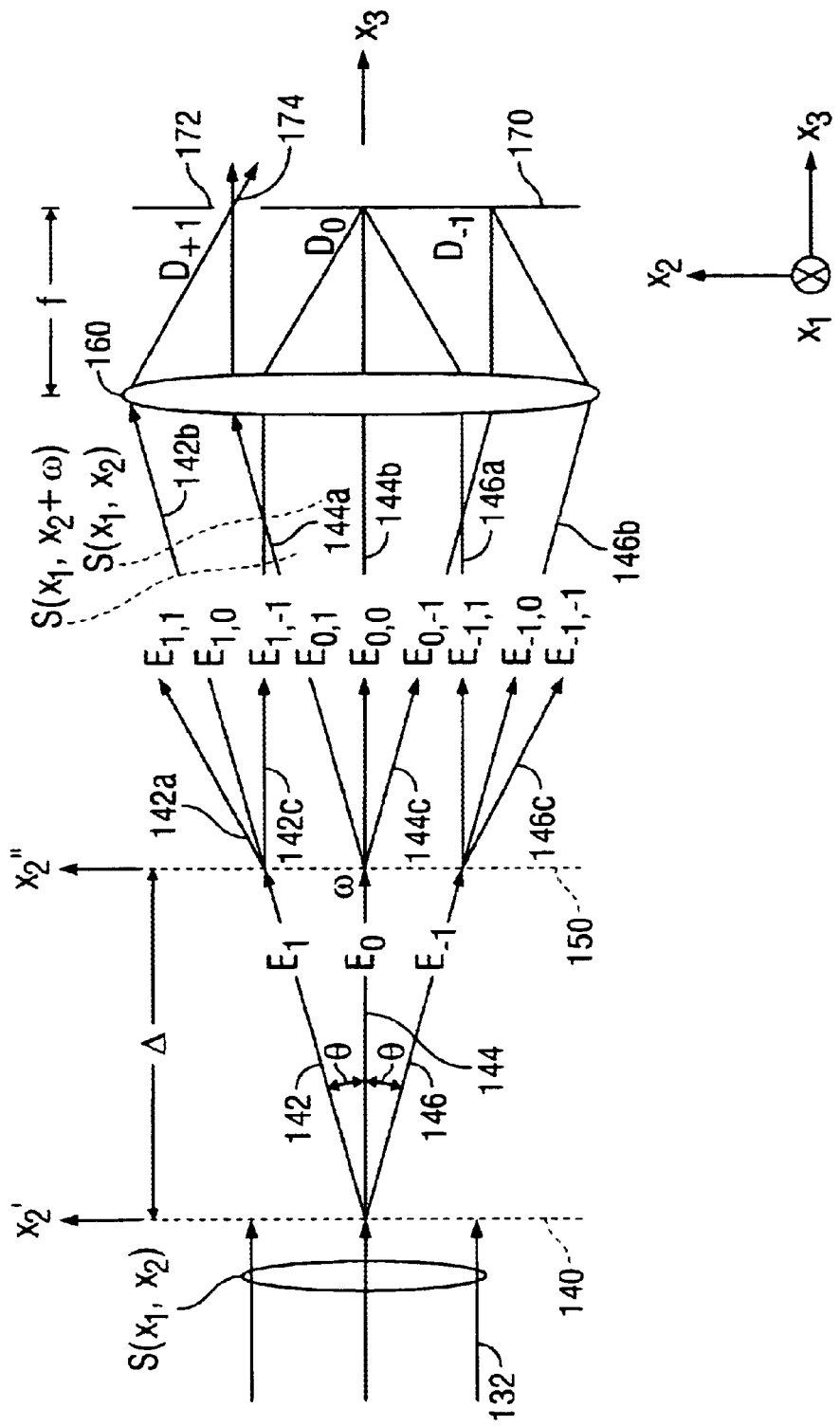
FIG. 19 illustrates the operations of the CGS system shown in FIG. 18.

FIG. 18 illustrates the working principle of the CGS system shown in FIG. 17 in two dimensions by using two identical gratings 140 and 150 aligned parallel to each other. Consider a Cartesian coordinate system $(x_1, x_2, x_3)$ in which the $x_2$ axis is parallel to the grating rulings of both the gratings 140 and 150.

The grating 140 ($G_1$) diffracts the reflected probe beam 132 into several diffraction waves denoted as $E_0$, $E_1$, $E_{-1}$, $E_2$, $E_{-2}$, etc. For illustrative purpose, only the first three diffraction orders, i.e., zero-order wave 144 ($E_0$), +1-order 142 ($E_1$), and −1-order wave 146 ($E_{-1}$) are shown. Each of these wave fronts is further diffracted by the second grating 150 ($G_2$) to generate multiple wavefronts. For example, the +1-order 142 ($E_1$) is diffracted to produce wavefronts 142a ($E_{1,1}$), 142b($E_{1,0}$), 142c($E_{1,-1}$), etc.; zero-order 144 ($E_0$) is diffracted to produce wavefronts 144a($E_{0,1}$), 144b($E_{0,0}$), 144c($E_{0,-1}$), etc.; and −1-order 146 ($E_{-1}$) is diffracted to produce wavefronts 146a ($E_{-1,1}$), 146b($E_{-1,0}$), 146c($E_{-1,-1}$), etc.

Certain diffracted beams generated by the grating 150 from different diffraction orders generated by the grating 140 are parallel since the two gratings 140 and 150 are identical. This could also occur when the ratio of the grating periods of the two gratings 140, 150 is an integer. Under such conditions, a lens can be conveniently used as the optical element 160 to overlap various sets of parallel diffracted beams emerged from the grating 150 with one another at or near the filtering plane 170 to form multiple diffraction spots. These diffraction spots have interference fringes due to the interference of the overlapped beams. The interference fringes have information indicative of the gradient of the phase distortion in the wavefront of the reflected probe beam 132.

For example, the zero-order diffraction beam 142b($E_{1,0}$) originated from the beam 142 is parallel to the +1-order diffraction beam 144a($E_{0,1}$) originated from the beam 144. These two beams 142b and 144a are focused to a point 174 ($D_{+1}$) on the filter place 170 by the lens 160. Similarly, the diffracted beams 142c and 144b overlap and interfere with each other to form a spot $D_0$, and beams 144c and 146b overlap and interfere with each other to form a spot $D_{-1}$, respectively.

The interference pattern of any of these spots has the information of the gradient of the phase distortion in the wavefront of the reflected probe beam 132 and can be used to determine the curvature of the specimen surface 130. The example in FIG. 18 shows the spot 174 ($D_{+1}$) is selected by the aperture 172 in the filter plane.

Assume that the wavefront of the reflected probe beam 132 is approximately planar and has a local phase variation $S(x_1, x_2)$. The net effect of the diffraction by the gratings 140 and 150 is to produce a lateral shift, or "shearing", of the incident wave front along the direction of the gratings, i.e., in the $x_2$-direction. For example, the wavefront of the diffracted beam 142b ($E_{1,0}$) is shifted by an amount, ω, along the $x_2$-direction as compared to the wave front of the diffracted beam 144a ($E_{0,1}$) so that the wavefronts of the beams 142b and 144a are given by $S(x_1, x_2+\omega)$ and $S(x_1, x_2)$, respectively. The wave front shift is parallel to the principal axis of the gratings, i.e. along $x_2$ if the grating lines are oriented along $x_1$ as shown in FIG. 18.

The optical wavefront of the reflected probe beam 132 may be associated with the topography of the specimen surface 130 as follows. A specularly reflective specimen surface 130 may be expressed as the following function:

$$F(x_1, x_2, x_3) = x_3 - f(x_1, x_2) = 0. \tag{X1}$$

A unit surface normal vector N at an arbitrary point ($x_1, x_2$) of this curved surface $F(x_1, x_2, x_3)$ can be determined by the following:

$$N = \frac{\Delta F}{|\Delta F|} = \frac{f_{,1}e_1 - f_{,2}e_2 + e_3}{\sqrt{1 + f_{,1}^2 + f_{,2}^2}}, \tag{X2}$$

where $f_{,\alpha}$ denotes in-plane gradient components of the specimen surface $x_3 = f(x_1, x_2)$, and $e_i$ represents the unit vector along the $x_i$ axis, (i=1, 2, 3). According to U.S. Pat. No. 6,031,611, the curvature tensor can be shown to have the following analytical form:

$$\kappa_{\alpha\beta} = \frac{f_{,\alpha\beta}}{\sqrt{1 + f_{,1}^2 + f_{,2}^2}}, \alpha, \beta \in \{1, 2\}. \tag{X3}$$

For small curvatures, the above equation can be approximated as, $$\kappa_{\alpha\beta}(x_1, x_2) \approx \frac{\partial^2 f(x_1, x_2)}{\partial x_\alpha \partial x_\beta} \approx \frac{p}{2\Delta}\left(\frac{\partial n^{(\alpha)}(x_1, x_2)}{\partial x_\beta}\right), \tag{X4}$$

$$n^{(\alpha)} = 0, \pm 1, \pm 2, \ldots$$

where p is the grating period of gratings 140 and 150, Δ is the spacing between the gratings 140 and 120, n(α) is an integer identifying interference fringes observed for shearing along the x1 or x2 directions, and α, β ∈ {1, 2}. Hence, the curvature tensor fields can directly computed from the gradients of a CGS interferogram with Eq. (X4) under small deformation approximation. For a given CGS system with certain parameters p and Δ, the curvature at any location on a specimen surface can be determined by measuring the number of fringes per unit length in desired directions. Thus, a CGS interferogram provides a full field technique for determining the instantaneous value of the specimen curvature tensor at any point, ($x_1, x_2$).

When the deformation is large, e.g., when the slope components are comparable to unity, the approximation in Eq. (X4) becomes inaccurate, the analytical formula in Eq. (X3) can be used to compute the curvatures with large deformation based on the surface gradient components obtained from two CGS interferograms. The large deformation curvatures are then used in the large deformation analytical method to determine the stress conditions.

One notable feature of the CGS technique is that, its operation does not depend on the wavelength of the illuminating light. Hence, a coherent radiation beam of any suitable wavelength may be used, including UV, visible, and IR spectral ranges. A suitable wavelength for the illumination may be selected depending the requirements of the application. For example, when a surface has small features or surface roughness that causes light scattering or diffusive reflections of illumination light at the UV or visible spectral range, a longer wavelength, e.g., an IR wavelength greater than the dimension of the feature size or surface roughness, may be used to achieve the optical specular reflection from such surface in order for the CGS system to operate properly. The surface with features or roughness is thus effectively treated as a surface that is uniform to the IR wavelength of the illumination beam. Hence, in one implementation, the surface roughness or feature size is determined first. Then, a proper illumination wavelength is selected to be greater than the dimension of the feature or roughness to achieve specular reflection. This illumination light is then used to carry out the CGS measurement. The large deformation analytical method may also be applicable here to approximately analyze the stress conditions of the surface.

Figure 20:
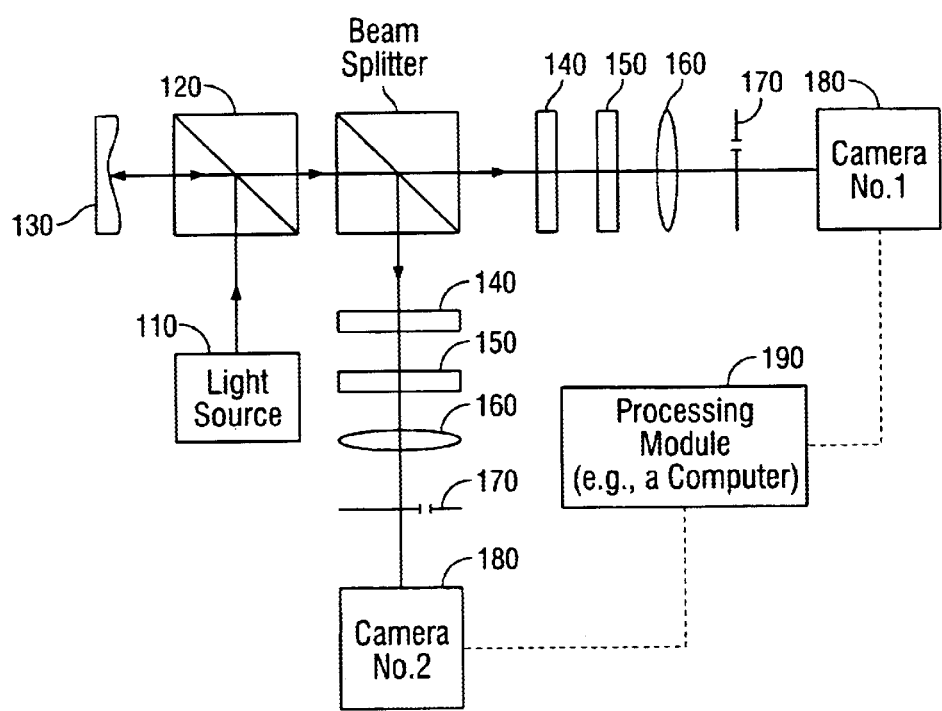
FIG. 20 shows one embodiment of a CGS system that simultaneously measures curvatures along two different directions in a surface.

Certain applications may require spatial shearing in two different directions to obtain a full-field two-dimensional curvature measurement, such as some applications with large deformations in surfaces. This may be done by using the CGS system in FIG. 17 to perform a first measurement when the sample surface 130 is at a first orientation and subsequently to perform a second measurement when the sample surface 130 is rotated to a second orientation (e.g., perpendicular to the first orientation). Alternatively, a two-arm CGS system, shown in FIG. 20 may be implemented to have two separate sets of double gratings in two different directions to simultaneously produce the interference pattern in two different spatial shearing directions. Hence, time-varying effects in the curvature distribution in both spatial shearing directions can be obtained.

The above CGS systems may be used to measure curvatures of various features and components formed on a substrate either directly or indirectly. In the direct measurement, the probe beam in the CGS can be directly sent to the top surface of these devices to obtain the curvature information. This usually requires that the surface features and components and their surrounding areas are preferably smooth and optically reflective. In addition, it is desirable that properties of the features and components and their surrounding areas other than their curvatures do not significantly contribute to the wavefront distortion. Hence, the wavefront distortion can be used as an indicator of the curvatures of the area illuminated by the optical probe beam. For example, some completed integrated circuits have a top passivation layer, usually made of a non-conductive dielectric material, over the circuit elements on the substrate to protect the underlying circuits. The surface of the passivation layer is in general smooth and is sufficiently reflective for CGS measurements.

However, the above conditions may not be met in some other substrate-based devices. For example, features and components formed on the front side of a substrate or their surrounding areas may not be optically reflective. The features and components on the front side may distort the reflected wavefront due to factors other than the curvatures, such as the height of a feature or component being different from its surrounding areas. In these cases, the curvatures of the features or components may be indirectly measured by inference from the curvature measurements of the corresponding locations on the opposite surface on the back side of the substrate. This is possible because the stresses in the non-continuous features and components formed on the substrate can cause the substrate to deform and the thin films formed over the substrate generally conform to the substrate surface.

When the heights of certain features are different from their surroundings, the phase distortion on the wavefront of the reflected probe beam for each feature includes at least the portion contributed from the height difference and the portion contributed from the curvatures. In addition to using the back side of the substrate for the CGS measurement, the CGS measurement may also be performed by illuminating the front side. The curvature information can thus be extracted by removing the effects of the height difference in computation of the curvatures if the height information is known.

The present large deformation analytical method assumes that at each xy plane, the layer or film is uniform in x and y directions. When a surface is fabricated with features, the method may still be applied by using a uniform surface to approximately represent the average properties of the surface with features. The combination of the CGS and the large deformation analytical method may be used to estimate the stress conditions.

In addition to curvature measurements of a completed substrate-based device, the CGS technique can also be used to perform in-situ curvature measurements of a substrate and each layer or feature during each fabrication step of a substrate-based device. The CGS technique can achieve this due to its full-field capability of simultaneously measuring the curvatures of all locations within an illuminated area. Therefore, each measurement can be performed and completed in a short time without interrupting the fabrication sequence. Because the CGS technique uses an optical probe beam as the probe to obtain the curvature information, the measurement is non-invasive and hence does not interfere with the fabrication process when the intensity of the optical probe beam is properly kept below an acceptable level. In addition, the optical probe beam and its reflected beam from the substrate can be conveniently guided to and from the substrate in a processing chamber through one or more optical windows in the processing chamber.

Therefore, during the fabrication of the thin-film layers and various features in each layer, the curvatures and associated stresses of each layer and each feature formed in each layer may be monitored in real time and in-situ with the CGS technique. This in-situ stress monitoring mechanism may be applied to various aspects of the substrate fabrication including film deposition and thermal cycling.

For example, this in-situ stress monitoring mechanism may be used to screen out a defective batch of processed substrates at any intermediate stage during the fabrication prior to completion of the entire fabrication processes. It is known that fabrication process and associated thermal cycling can introduce stresses in fabricated features. For example, the various metallization processes are carried out at elevated temperatures. Also, the layers may exhibit different mechanical, physical and thermal properties which can lead to high stresses in interconnection structures due to, e.g., mismatch in the amounts of thermal expansion and contraction between dissimilar materials. These stresses can cause, among others, undesired stress-induced voiding and interfacial cracking or delamination, and can contribute to stress migration and to electromigration. In addition, the stresses may cause cracking of the substrate. Voiding, stress migration, electromigration, and substrate cracking are among the leading failure factors in integrated circuits.

Some of the defects are caused by stresses after an intermediate step during the fabrication. A device is defective when the stresses at various parts exceed predetermined acceptable values. The above in-situ stress monitoring can be used to measure the curvatures and the stresses at selected stages or continuously during the fabrication. The measured curvatures and stresses are compared to the acceptable values. If a measured curvature or stress is greater than its acceptable value, an area on the surface where the probability of forming a defect, is identified. The fabrication process may be terminated since the final device would be defective. Thus, the remaining fabrication steps need not be carried out. This avoids the wasteful and inefficient practice in some conventional fabrication methods where the defects of the fabricated devices are tested only after the entire fabrication processes are completed.

Another exemplary application of this in-situ stress monitoring mechanism is adjustment and optimization of the processing parameters and conditions in fabrication to reduce the stresses in the substrates. Because the CGS technique can be used to monitor the stresses in situ during the fabrication, contributions to the stresses from different processing steps can be identified by monitoring the stresses at each processing step. In addition, the processing parameters (e.g., temperature, duration or duty cycle of thermal budget) of each processing step may be adjusted either independently or in reference with the processing parameters of other processing steps to reduce the stresses. Effects on the stresses may be measured by the CGS technique upon each adjustment so that a relation between the parameter and the stresses can be established. The steps of adjusting a processing parameter and measuring the resultant stresses may be carried out in an iteration process until the resultant stresses are reduced to satisfactory levels. Hence, the processing steps can be controlled to increase the overall yield of the fabrication.

Referring back to FIGS. 5B and 8, as the stresses increase, the curvature of a plate structure evolves from a small deformation regime to a large deformation region and finally to the bifurcated regime. As described above, the large deformation analytical method is applicable to all three regimes. Hence, the large deformation analytical method may be used to estimate the stress condition within the plate structure to control the stress condition in a particular regime, e.g., the small deformation regime, or to avoid the bifurcation.

In particular, the plate structure, such as a flat panel, is generally mounted to a support structure in a device or system. As evidenced by the above description, the forces on the plate structure by the support points may significantly impact the stress condition in the plate structure. Therefore, the large deformation analytical method may be used to provide a support design to achieve a desired stress condition in actual operation of the device or system that uses the plate structure. In the examples of three-point support shown in FIGS. 3, 4, and 9, the support parameters $\bar{a}$, $\bar{b}$, and $\bar{c}$ may be selected to produce the desired stress condition. In general, the large deformation analytical method may be used to select a support configuration to reduce the final stresses in the device or to avoid the bifurcation point. In addition, a uniform body force or a concentrated force acting on the center of gravity of the plane may be purposely introduced to achieve a desired stress condition. These techniques may be combined in designing the support system of the plate structure in devices and systems.

Only a few embodiments are disclosed. However, it is understood that variations and enhancements may be made without departing from the spirit of and are intended to be encompassed by the following claims.

What is claimed is:

1. A method, comprising:
   providing a plate structure to represent a device;
   using a first spatial-varying function that is uniform within a plane of said plate structure and varies along a direction perpendicular to said plane to represent a body force acting on said device which affects evolution of curvature of said device;
   using a second spatial-varying function that is uniform within said plane and varies along a direction perpendicular to said plane and with a temperature of said device to represent effects of thermal stresses in said device;
   using nonlinear functions of positions within said plane to represent displacements of said device within two principal directions within said plane and a third principal direction perpendicular to said plane, respectively, to include effects of large deformation;
   computing a total potential energy of said device based on said first and said second spatial-varying functions and said nonlinear functions for said displacements; and
   minimizing said total potential energy with respect to principal curvatures and axial stretches respectively along said two principal directions within said plane to derive analytical relationships between an effective force for causing curvature evolution of said device and principal curvatures along said two principal directions.

2. The method as in claim 1, further comprising using said analytical relationships to determine a critical curvature at which a geometric shape of said device bifurcates.

3. The method as in claim 1, further comprising:
   measuring curvatures of said device; and
   using said analytical relationships to determine stresses in said device based on measured curvatures.

4. The method as in claim 3, wherein said curvatures are measured by:
   projecting an optical probe beam to a surface of said device;
   collecting a reflection of said optical probe beam from said surface; and
   processing said reflection to obtain information on said curvatures.

5. The method as in claim 4, wherein said processing includes:
   obtaining gradients of coherent interference infringes in said reflection for an area on said surface illuminated by said optical probe beam; and
   using said gradients to compute said curvatures with said area.

6. The method as in claim 5, wherein said measuring is performed during fabrication of said device to monitor stress variation during said fabrication.

7. The method as in claim 4, wherein said measuring is performed during fabrication of said device to monitor stress variation during said fabrication.

8. The method as in claim 3, wherein said measuring is performed during fabrication of said device to monitor stress variation during said fabrication.

9. The method as in claim 1, further comprising including a load acting at a center of gravity of said device in computing said total potential energy.

10. The method as in claim 1, wherein said body force includes the gravitational force acting on said device.

11. The method as in claim 1, wherein said body force includes an electrostatic force acting on said device.

12. The method as in claim 1, wherein said body force includes an electromagnetic force acting on said device.

13. The method as in claim 1, further comprising:
    providing a plurality of support points to support said plate structure; and
    including effects of support forces on said plate structure produced by said support points and the gravity acting on said plate structure in said total potential energy to derive said analytical relationships.

14. The method as in claim 13, further comprising selecting geometrical configuration of said support points and said support forces to reduce stresses in said device.

15. The method as in claim 13, further comprising selecting geometrical configuration of said support points and said support forces to maintain deformation in said device below a critical deformation condition when evolution of curvature of said plate structure bifurcates.

16. The method as in claim 1, wherein said plate structure includes a substrate and at least one film formed over said substrate, wherein said second spatial-varying function includes a thermal stress in said one film and a thermal stress in said substrate.

17. A system, comprising:
    a sample holder to hold a device with a plate structure;
    a curvature-measuring module disposed relative to said sample holder to measure curvatures of said plate structure; and
    a processing module receiving measured curvatures from said curvature-measuring module and operable to compute stresses in said plate structure to include an effect of a force acting on said plate structure according to analytical formula,
    wherein said processing module is programmed to perform the following operations:
      using a first spatial-varying function that is uniform within a plane of said plate structure and varies along a direction perpendicular to said plane to represent a body force acting on said device which affects evolution of curvature of said device;
      using second spatial-varying function that is uniform within said plane and varies along a direction perpendicular said plane and with a temperature of said device to represent effects of thermal stresses in said device;
      using nonlinear functions of positions within said plane represent displacements of—said device within two principal directions within said plane and a third principal direction perpendicular to said plane, respectively, include effects of large deformation;
      computing a total potential energy of said device based on said first and said second spatial-varying functions and said nonlinear functions for said displacements; and
      minimizing said total potential energy with respect principal curvatures and axial stretches respectively along said two principal directions within said plane analytical formulae that relate an effective force for causing derive said curvature evolution of said device said two principal directions.

18. The system as in claim 17, wherein said curvature-measuring module produces and directs an optical probe beam to said plate structure and processes a reflection of said optical probe beam by said plate structure to measure said curvatures.

19. The system as in claim 18, said curvature-measuring module includes:

first and second gratings spaced relative to each other in an optical path of said reflection and configured to produce a predetermined phase manipulation on a wavefront of said reflection, wherein said predetermined phase manipulation is produced by diffractions that are produced by said first and second gratings;

an optical element positioned to receive said reflection from said first and second gratings and configured to select and combine two diffraction components from said second grating to produce an interference pattern, wherein said selected two diffraction components are produced by said second grating from diffracting two different diffraction components from said first grating; and an optical sensing device disposed relative to said optical element to receive said interference pattern and produce an electrical signal indicative of said interference pattern.

20. A method, comprising:

determining a dimension of one or more features on a surface;

selecting a wavelength of a coherent probe beam to be greater than said dimension to allow said surface to be specularly reflective to said coherent probe beam;

illuminating said coherent probe beam onto said surface to produce a reflected probe beam, producing a first set of diffraction components of said reflected probe beam by using a first grating;

producing a second set of diffraction components of said reflected probe beam by using a second grating spaced from said first grating by a predetermined distance, wherein each of first set of diffraction components is diffracted by said second grating to produce a plurality of diffraction components;

combining two diffraction components that are produced by said second grating from diffracting two different diffraction components selected from said first set of diffraction components to produce an interference pattern; and processing said interference pattern to determine curvature information of said surface.

21. The method as in claim 20, further comprising using analytical formula to determine stresses in said surface based on said curvature information, wherein said analytical formula is obtained by:

using a first spatial-varying function that is uniform within said surface and varies along a direction perpendicular to said surface to represent a body force acting on said surface;

using a second spatial-varying function that is uniform within said surface and varies along a direction perpendicular to said surface and with a temperature of said surface to represent effects of thermal stresses in said surface;

using nonlinear functions of positions within said surface to represent displacements of said surface within two principal directions within a plane and a third principal direction perpendicular to said plane, respectively, to include effects of large deformation;

computing a total potential energy of said surface based on said first and said second spatial-varying functions and said nonlinear functions for said displacements; and minimizing said total potential energy with respect to principal curvatures and axial stretches respectively along said two principal directions within said plane to derive analytical relationships between said principal curvatures and an effective force for causing curvature evolution of said surface.

* * * * *

UNITED STATES PATENT AND TRADEMARK OFFICE
CERTIFICATE OF CORRECTION

PATENT NO. : 6,781,702 B2
DATED : August 24, 2004
INVENTOR(S) : Antonios Giannakopoulos et al.

It is certified that error appears in the above-identified patent and that said Letters Patent is hereby corrected as shown below:

Column 32,
Line 43, please add the word -- a -- after "using".
Line 57, please add the word -- to -- after "respect".
Line 62, please add the word -- along -- after "device".

Signed and Sealed this

Tenth Day of May, 2005

JON W. DUDAS
*Director of the United States Patent and Trademark Office*